(12) United States Patent
Sridharan et al.

(10) Patent No.: US 9,953,556 B2
(45) Date of Patent: Apr. 24, 2018

(54) COLOR CORRECTION METHOD FOR OPTICAL SEE-THROUGH DISPLAYS

(71) Applicant: University of Manitoba, Winnipeg (CA)

(72) Inventors: Srikanth Kirshnamachari Sridharan, Winnipeg (CA); Juan David Hincapie Ramos, Winnipeg (CA); Pourang Irani, Winnipeg (CA)

( * ) Notice: Subject to any disclaimer, the term of this patent is extended or adjusted under 35 U.S.C. 154(b) by 65 days.

(21) Appl. No.: 15/027,097

(22) PCT Filed: Oct. 6, 2014

(86) PCT No.: PCT/CA2014/050966
§ 371 (c)(1),
(2) Date: Apr. 4, 2016

(87) PCT Pub. No.: WO2015/048911
PCT Pub. Date: Apr. 9, 2015

(65) Prior Publication Data
US 2016/0240125 A1 Aug. 18, 2016

Related U.S. Application Data

(60) Provisional application No. 61/887,039, filed on Oct. 4, 2013.

(51) Int. Cl.
*G09G 3/20* (2006.01)
*G09G 5/02* (2006.01)
(Continued)

(52) U.S. Cl.
CPC ......... *G09G 3/2003* (2013.01); *G02B 27/017* (2013.01); *G09G 5/02* (2013.01);
(Continued)

(58) Field of Classification Search
CPC combination set(s) only.
See application file for complete search history.

(56) References Cited

U.S. PATENT DOCUMENTS

| 2001/0019427 A1* | 9/2001 | Komatsu | H04N 1/6058 358/1.18 |
| 2003/0137547 A1* | 7/2003 | Brown | G06F 3/14 715/865 |

(Continued)

OTHER PUBLICATIONS

Hincapie-Ramos, J. D. et al., "SmartColor: Real-Time Color Correction and Contract for Optical See-Through Head-Mounted Displays", Proceedings of the 2014 IEEE International Symposium on Mixed and Augmented Reality, ISMAR' 14, Munich, Germany, Sep. 10-12, 2014 pp. 187-194.
(Continued)

*Primary Examiner* — Wesner Sajous
(74) *Attorney, Agent, or Firm* — Ryan W. Dupuis; Ade + Company Inc.; Kyle R. Satterthwaite

(57) ABSTRACT

In a method of correcting a desired color of a pixel to be displayed in an optical see-through display, a binned-display profile of prescribed colors arranged to be rendered by the display include background colors added to it so that the desired color can be matched to a closest one of the resulting predicted color profile of colors which are predicted to be perceived by a user. The display is then instructed to display the prescribed color which corresponds with the closest matching predicted color such that an observer substantially perceives the desired color. Typically the desired color is only compared to a subset of the predicted colors for efficiency. Additional corrections may take place to improve contrast of graphical content compared to the background in some instance.

14 Claims, 16 Drawing Sheets

(51) Int. Cl.
*H04N 9/69* (2006.01)
*H04N 9/67* (2006.01)
*H04N 1/60* (2006.01)
*G02B 27/01* (2006.01)

(52) U.S. Cl.
CPC .......... *G02B 2027/014* (2013.01); *G02B 2027/0112* (2013.01); *G09G 2320/0242* (2013.01); *G09G 2340/06* (2013.01); *G09G 2340/10* (2013.01)

(56) References Cited

U.S. PATENT DOCUMENTS

| | | | | |
|---|---|---|---|---|
| 2006/0125844 A1* | 6/2006 | Hasegawa | ............... | G09G 5/14 345/619 |
| 2006/0221017 A1* | 10/2006 | Fang | ............... | G09F 9/30 345/83 |
| 2011/0148903 A1* | 6/2011 | Poree | ............... | G06T 7/12 345/589 |
| 2012/0081722 A1* | 4/2012 | Katayama | ............... | H04N 1/6033 358/1.9 |
| 2013/0215440 A1* | 8/2013 | Chandermohan | ............... | B41J 2/2117 358/1.9 |
| 2013/0314453 A1* | 11/2013 | Ko | ............... | G09G 5/10 345/690 |
| 2014/0176591 A1* | 6/2014 | Klein | ............... | G09G 3/003 345/589 |

OTHER PUBLICATIONS

Weiland, C., et al.: "Colorimetric and photometric compensation for optical see-through displays", Universal Access in Human-Computer Interaction., vol. 5615, pp. 603-612. Proceedings of the 5th International Conference no Universal Access in Human-Computer Interaction. Intelligent and Ubiquitous Interaction Environments, UAHCI 2009, Part II Held as Part of HCI International 2009, San Diego, CA, USA, Jul. 19-24, 2009.

Gabbard, J. et al. "More than meets the eye: An engineering study to empirically examine the blending of real and virtual color spaces", Virtual Reality Conference (VR), IEEE Annual International Symposium—VR, 2010, pp. 79-86.

Heer, J. et al.: "Color naming models for color selection, image editing and palette design", Proceedings of the SIGCHI Conference on Human Factors in Computing Systems, ACM, New York, NY, USA, CHI '12, pp. 1007-1016.

* cited by examiner

COLOR CORRECTION METHOD FOR OPTICAL SEE-THROUGH DISPLAYS

FIELD OF THE INVENTION

The present invention relates to a method of accurately representing color on an optical see-through display by considering both how the display renders color and how the color of the background affects the perception of color by a user. The present invention further relates to additional corrections of the color to be display to ensure sufficient contrast between graphical items to be display and the background visible through the display.

BACKGROUND

Optical see-through (OST) displays allow users to view digital content and physical objects simultaneously. They come in multiple form factors (e.g. head mounted displays, projection-based and transparent LCD and OLEDs) and are widely used in augmented reality (AR) applications including medical, maintenance, education and training (see [Bimber and Raskar 2005][Carmigniani et al. 2011] for a comprehensive list of applications). OST displays can be additive (have their own light source e.g. projection-based displays or transparent OLED) or subtractive (filter white light from an external source e.g. LCD). With a few consumer electronics starting to adopt them [Lenovo 2013] [Epson 2013] and the continuous development of transparent OLED (Futaba Corporation [link], Fujitsu [link], Winstar [link]) and LCD displays (Samsung NL22B [link], Eyevis [link]) we expect they will be widely available.

An important aspect of additive OST displays is that light coming from real-world objects mixes with the light emitted by the display: also known as color blending [Gabbard et al. 2010]. Color blending is an important issue as it affects the legibility and color—encodings of digital information and compromises the general us—ability of such devices. Existing solutions include using a spatial light modulator (SLM) to block background light [Kiyokawa et al. 2002][2003], an approach requiring extra hardware on the display at the cost of non-transparency. Color correction is another solution where the system finds an alternative digital color which, upon blending with the background, comes closest to the desired color [Weilland et al. 2009].

The perception of color as a blend of the display color and the background [4] can be a major usability problem in optical head-mounted displays (OHMD). For example, users perceive red as magenta when the background is blue, and as yellow when the background is green. Color blending has several negative effects on the display content it reduces the readability of text [18], makes augmented reality (AR) objects look translucent and unreal [1], Impairs the interpretation of color-encoded information such as status icons or system alerts, and leads users to confusion [19]. Therefore, addressing color blending is an important issue as it compromises the usability and adoption of OHMDs [10] [11].

Existing solutions to color blending include occlusion support and color correction. The occlusion approach uses spatial light modulators such as liquid crystals to block light coming from the background and keep it from blending with the display color [3]. Occlusion support requires additional optical hardware, making the OHMD bulky [3][5] and compromising its transparency [14]. The color correction approach consists on determining an alternative color which, upon blending with the background, results on a color closer to the one originally designed for. Color correction does not require additional optical hardware and therefore does not affect the overall transparency and lightness of the display. However, existing color correction algorithms are not usable. Weiland et al. proposed several correction algorithms which often result on black or depend on arbitrary constants [24].

REFERENCES

The following references are incorporated herein by reference and are referred to throughout the specification by number and by reference to the author.

[1] Bimber, O., Grundhöfer, A., Wetzstein, G. and Knödel. S. 2003. Consistent Illumination within Optical See-Through Augmented Environments. In Proc. ISMAR '03. IEEE Computer Society.

[2] Bimber, O. and Raskar, R. 2005. Spatial Augmented Reality: Merging Real and Virtual Worlds. A. K. Peters Ltd., Natick, USA.

[3] Cakmakci, O., Ha, Y. and Roland, J. 2004. A compact optical see-through head-worn display with occlusion support. In Proc. ISMAR '04. IEEE/ACM.

[4] Gabbard, J., Swan, J., Zedlitz, J. and Winchester, W. W. 2010. More than meets the eye: An engineering study to empirically examine the blending of real and virtual color spaces. In Proc. VR '10. IEEE.

[5] Gao, C., Lin, Y. and Hua, H. 2012. Occlusion capable optical see-through head-mounted display using freeform optics. In Proc. ISMAR '12. IEEE.

[6]. Gao, C., Un, Y. and Hua, H. 2013. Optical see-through head-mounted display with occlusion capability. In Proc. SPIE 8735, Head/Helmet-Mounted Displays XVIII: Design and Applications.

[7] Heer, J. and Stone, M. 2012. Color naming models for color selection, image editing and palette design. In Proc. CHI '12. ACM.

[8] Kiyokawa, K., Kurata, Y. and Ohno, H. 2001. An optical see-through display for mutual occlusion with a real-time stereovision system. Computers and Graphics 25, 5, 765-779.

[9] Kiyokawa, K., Ohno, H. and Kurata, Y. 2002. Occlusive optical see-through displays in a collaborative setup. In ACM SIGGRAPH 2002 conference abstracts and applications, ACM.

[10] Kerr, S. J., Rice, M. D., Teo, Y., Wan, M., Cheong, Y. L., NG, J., Ng-Thamrin, L., Thura-Myo, T. and Wren, D. 2011. Wearable mobile augmented reality: evaluating outdoor user experience. In Proc. VRCAI '11. ACM.

[11] Kruijff, E., Swan, J. and Feiner, S. 2010. Perceptual issues in augmented reality revisited. In Proc. ISMAR '10. IEEE/ACM.

[12] Leykin, A. and Tuceryan, M. 2004. Automatic determination of text readability over textured backgrounds for augmented reality systems. In Proc. ISMAR '04. ACM/IEEE. 224-230.

[13] Mahy, M., Eycken, L. V. and Oosterlinck, A. 1994. Evaluation of uniform colour spaces developed after the adoption of CIELAB and CIELUV. Color Research and Application 19, 2, 105-121.

[14] Maimone, A. and Fuchs, H. 2013. Computational augmented reality eyeglasses. In Proc. ISMAR '2013. IEEE.

[15] Menk, C. and Koch, R. 2011. Interactive visualization technique for truthful color reproduction in spatial augmented reality applications. In Proc. ISMAR '11. IEEE. 157-164.

[16] Movania, M. M. 2013. OpenGL Development Cookbook. Packt Publishing Ltd. OpenGL—The Industry. 2014. Offical website for the OpenGL standard. [Website] http://www.khronos.org/opengl/

[17] Pingel, T. J. and Clarke, K. C. 2005. Assessing the usability of a wearable computer system for outdoor pedestrian navigation. Autocarto ACSM.

[18] Sekuler, A. and Palmer, S. 1992. Perception of partly occluded objects: A microgenetic analysis. Journal of Exp. Psychology 121, 1.

[19] Sharma, G., Wu, W. and Dalal, E. N. 2005. The CIEDE2000 color-difference formula: Implementation notes, supplementary test data, and mathematical observations. Color Research & Application, 30(1).

[20] Smithwick, Q. Y. J., Reetz, D. and Smoot, L 2014. LCD masks for spatial augmented reality. In Proc. SPIE 9011, Stereoscopic Displays and Applications XXV, 901100.

[21] Sridharan, S. K., Hincapié-Ramos, J. D., Flatla, D. R. and Irani, P. 2013. Color correction for optical see-through displays using display color profiles. In Proc. VRST '13. ACM.

[22] Tanaka, K., Kishino, Y., Mlyamae, M., Terada, T. and Nisho, S. 2008. An Information layout method for an optical see-through head mounted display focusing on the viewablity. In Proc. ISMAR '08. IEEE/ACM. 139-142.

[23] Weiland, C., Braun, A. K. and Heiden, W. 2009. Colorimetric and Photometric Compensation for Optical See-Through Displays. In Proc. UAHCI '09. Springer-Verlag.

[24] Zuffi, S., Brambilla, C., Beretta, G. and Scala, P. 2007. Human Computer Interaction: Legibility and Contrast. In Proc. ICIAP '07. IEEE Computer Society.

[25] ASHDOWN, M., OKABE, T., SATO, I., AND SATO, Y. 2006. Robust content-dependent photometric projector compensation. In Computer Vision and Pattern Recognition Workshop, 2006. CVPRW '06. Conference on, 6-6.

[26] BIMBER, O., AND FROHLICH, B. 2002. Occlusion shadows: using projected light to generate realistic occlusion effects for view-dependent optical see-through displays. In Mixed and Augmented Reality, 2002. ISMAR 2002. Proceedings. International Symposium on, 186-319

[27] BIMBER, O., EMMERLING, A., AND KLEMMER, T. 2005. Embedded entertainment with smart projectors. Computer 38, 1, 48-55.

[28] CARMIGNIANI, J., FURHT, B., ANISETTI, M., CERAVOLO, P., DAMIANI, E., AND IVKOVIC, M. 2011. Augmented reality technologies, systems and applications. Multimedia Tools and Applications 51, 1, 341-377.

[29] EPSON, 2013. Epson moverlo bt-100—android powered interactive display—epson America, inc. http://www.epson.com/cgi-bin/Store/jsp/Moverio/Home.do?BVUseBVCookie=yes. Accessed: 2013-04-23.

[30] GROSSBERG, M., PERI, H., NAYAR, S., AND BEL-HUMEUR, P. 2004. Making one object look like another: controlling appearance using a projector-camera system. In Computer Vision and Pattern Recognition, 2004. CVPR 2004. Proceedings of the 2004 IEEE Computer Society Conference on, vol. 1, I-452-I-459 Vol. 1.

[31] HONG, G., LUO, M. R., AND RHODES, P. A. 2001. A study of digital camera colorimetric characterization based on polynomial modeling. John Wiley and Sons, Inc., vol. 26, 76-84.

[32] INAMI, M., KAWAKAMI, N., SEKIGUCHI, D., YANAGIDA, Y., MAEDA, T., AND TACHI, S. 2000. Visuo-haptic display using head-mounted projector. In Virtual Reality, 2000. Proceedings. IEEE, 233-240.

[33] KIYOKAWA, K., BILLINGHURST, M., CAMPBELL, B., AND WOODS, E. 2003. An occlusion-capable optical see-through head mount display for supporting co-located colaboration. In Proceedings of the 2nd IEEE/ACM International Symposium on Mixed and Augmented Reality, IEEE Computer Society, Washington, DC, USA, ISMAR '03, 133.

[34] LENOVO, 2013. Lenovo s800:full phone specifications. http://www.asmarena.com/lenovos800-4862.php. Accessed: 2013-04-23.

[35] LINDBLOOM, 2013. Chromatic adaptive transformation http://www.brucelindbloom.com/index.html?Eqn_ChromAdapt.html. Accessed: 2013-04-23.

[36] MCCAMY, C. S. AND MARCUS, H., AND DAVIDSON, J. G. 1976. A color-rendition chart. Journal of Applied Photographic Engineering 2, 3, 95-99.

[37] NAYAR, S. K., PERI, H., GROSSBERG, M. D., AND BEL HUMEUR, P. N. 2003. A projection system with radiometric compensation for screen imperfections

[38] NODA, S., BAN, Y., SATO, K., AND CHIHARA, K. 1999. An optical see-through mixed reality display with realtime rangefinder and an active pattern light source. Transactions of the Virtual Reality Society of Japan 4, 4, 665-670.

[39] SUSSTRUNK, S. E., HOLM, J. M., AND FINLAYSON, G. D. 2000. Chromatic adaptation performance of different rgb sensors. 172-183.

[40] ZHOU, Y., MA, J.-T., HAO, Q., WANG, H., AND LIU, X.-P. 2007. A novel optical see-through head-mounted display with occlusion and intensity matching support. In Technologies for E-Learning and Digital Entertainment, Springer Berlin Heidelberg, vol. 4469 of Lecture Notes in Computer Science, 56-62.

SUMMARY OF THE INVENTION

Effective color correction depends on an accurate color blending model. A model is described herein that takes into account two distortions induced by the display: the render and material distortions. The render distortion explains how a particular display renders colors. The material distortion explains how the display material (acrylic or glass) changes background colors. Characterizing these two distortions enables the model to predict color blending, which in turn allows creation of an effective color correction algorithm.

Render distortion is characterized via display binned-profiles (BP). A BP is a descriptor of how the display shows color. A BP is created by dividing the continuous universe of sRGB colors into discrete and finite bins, and measuring how the display renders each bin. We account for the material distortion through objective measures of background colors as seen through the display material. We validate the use of BPs in our color blending model against four other methods of estimating how a display renders color: the direct method (DM) and three chromatic adaption transformation (CAT) methods. The direct method ignores that each display renders colors differently (called "trivial correction" by Weiland et al. [2009]). The CAT methods use known color transformation matrices based on the brightest white of the display.

Our validation compares how accurately our model predicts color blending using the different methods. We used a colorimeter to objectively measure the resulting blend of different background and display colors on three OST displays. Based on these measurements we computed prediction error as the difference between the predicted and the measured colors. Results showed that BP-based predictions outperform all others in our three displays.

A BP-based color correction algorithm is described herein for additive displays. Results show that display colors are corrected more accurately for displays with limited color profiles and for low luminosity backgrounds. Correction is harder for high luminosity backgrounds. For the display with the largest color profile, our approach corrected light display colors better, particularly in the neutrals and Cyan-Blue regions.

This invention contributes to the field of OST displays in several ways: 1) we introduce a color blending model for additive OST displays based on two color distortions, 2) we introduce the BP method and validate our model with it, 3) we propose BP-based color correction and studied it using a wide range of colors, and 4) we elaborate on the applicability, design and hardware implications of our approach.

In the following, two further contributions are also provided. First, a real-time color correction algorithm based on display color profiles is described herein and referred to QuickCorrection. This algorithm avoids exhaustive search by understanding the problem as a search in the three dimensions of the CIE LAB color space. We present two implementations of our algorithm for the OpenGL platform and study their accuracy and performance.

A second further contribution, referred to herein SmartColor, relates to a user-interface framework aimed at mitigating the effects of color blending on user-interface components according to three color management strategies: correction, contrast, and show-up-on-contrast (see FIG. 16). In correction mode, SmartColor executes the real-time color correction algorithm aiming at maintaining color encodings. In contrast mode, SmartColor limits the three-dimensional search to include only the colors that provide a difference of 27 units in luminance required for text readability [25] while preserving as much of the original hue as possible. Finally, the show-up-on-contrast mode makes content visible only when the contrast of related content is compromised by the background.

According to a first aspect of the invention there is provided a method of correcting a desired color of a pixel to be displayed in an optical see-through display through which a background is visible, the method comprising:

identifying a display profile of prescribed colors arranged to be rendered by said display;

identifying a background color of said background associated with the respective pixel;

determining a perceived profile of predicted colors which are predicted to be perceived by a user by adding said background color of the background to the prescribed colors of the display profile;

identifying a selected one of the predicted colors which most closely matches the desired color by comparing the desired color to the predicted colors of the perceived profile; and instructing the display to display the prescribed color which is associated with said selected one of the predicted colors such that an observer substantially perceives the desired color.

Preferably the method further comprises correcting the background color such that the background color represents the background as seen through a material forming a see-through display portion of the display prior to adding said background color to the prescribed colors of the display profile when determining the perceived profile of predicted colors. Preferably each color is defined using an XYZ color space.

Preferably the method further comprises identifying said selected one of the predicted colors by: i) identifying a subset of predicted colors which are most closely related to the desired color; and ii) comparing the desired color only to said subset of the predicted colors of the perceived profile.

Preferably the subset of predicted colors is limited to the predicted colors which have a luminance which is at least a prescribed number of units greater than a luminance of the respective background color of the respective pixel such that the prescribed number of units defines a minimum contrast limit.

The method may further include identifying said selected one of the predicted colors by: (i) representing the predicted colors as a matrix of color points along three defined axes; (II) initially defining a selected color point at a central location along each of the three defined axes; (iii) identifying two sample color points in opposing directions along each of the three defined axes relative to the selected color point; (iv) determining which matching ones of the sample color points are a closer match to the desired color than the selected color point; (v) determining an average vector which represents an average of said matching ones of the sample color points relative to the selected color point; (vi) redefining the selected color point by applying the average vector to the previously selected color point whereby the selected color point remains as the previously selected color point if none of the sample color points are determined to be a matching one; (vii) repeating steps (iii) through (vi) until the selected color point substantially matches the desired color; and (viii) defining said selected one of the predicted colors as the selected color point.

Steps (iii) through (vi) may be repeated for a prescribed number of repetitions which defines an iteration limit. Alternatively, if the selected color point remains as the previously selected color point, the method may include repeating steps (iii) through (vi) by identifying two new sample color points in opposing directions at a reduced distance along each of the three defined axes relative to the previously identified sample color points.

Preferably the algorithm ceases to repeat steps (iii) and (vi) when a difference between the selected color point and the desired color are below a minimum threshold.

When consideration is given for contrast, the method may include removing sample color points having a contrast relative to the respective background color which is below a minimum contrast limit from said group of color points prior to determining which color point most closely matches the desired color.

According to another aspect of the present invention there is provided a method of displaying pixels of a graphic object, the method comprising:

i) displaying a desired color of the pixels of the object according to the first aspect of the invention described above; and ii) if said selected color has a luminance which is less than a prescribed number of units from a luminance of the respective background color of the respective pixels, defining a surrounding object comprised of plural pixels which fully surrounds the graphic object and which has a prescribed contrasting color.

The prescribed contrasting color is preferably displayed according to the method for displaying a desired color as described above with regard to the first aspect of the present invention.

According to a third aspect of the present invention there is provided a method of displaying pixels of a graphic object defined as a set of first primitives in which each first primitive is defined by a set of vertices, the method comprising:

redefining the graphic object as a set of second primitives in which each second primitive is defined by a set vertices and in which the set of second primitives are reduced in size and increased in number relative to the set of first primitives;

associating a desired color with each of the vertices of the second primitives according to the method of displaying a desired color of a pixel according to the first aspect of the present invention as described above.

The method may further include applying a voting algorithm to determine a common one of the desired colors which is associated with the greatest number of vertices of the second primitives, and assigning the common one of the desired colors to all of the vertices of the second primitives before converting the vertices into fragments or pixels.

Various embodiments of the invention will now be described in conjunction with the accompanying drawings in which:

BRIEF DESCRIPTION OF THE DRAWINGS

FIG. 6A shows the difference between theoretical background colors and how our test-bed produces them while FIGS. 6B and 6C show how we measured each background color would be seen through the see-through displays.

In the drawings like characters of reference indicate corresponding parts in the different figures.

DETAILED DESCRIPTION

In optical see-through displays, light coming from background objects mixes with the light originating from the display, causing what is known as the color blending problem. Color blending negatively affects the usability of such displays as it impacts the legibility and color encodings of digital content. Color correction aims at reducing the impact of color blending by finding an alternative display color which, once mixed with the background, results in the color originally intended.

In this specification we model color blending based on two distortions induced by the optical see-through display. The render distortion explains how the display renders colors. The material distortion explains how background colors are changed by the display material. We show the render distortion has a higher impact on color blending and propose binned-profiles (BP) descriptors of how a display renders colors to address it. Results show that color blending predictions using BP have a low error rate within nine just noticeable differences (JND) in the worst case.

We introduce a color correction algorithm based on predictions using BP and measure its correction capacity. Results show light display colors can be better corrected for ail backgrounds. For high intensity backgrounds light colors in the neutral and CyanBkue regions perform better. Finally, we elaborate on the applicability, design and hardware implications of our approach.

Furthermore, an algorithm referred to herein as Quick-Correction, is also presented as a real-time color correction algorithm based on display profiles. We describe the algorithm, measure its accuracy and analyze two implementations for the OpenGL graphics pipeline. A further algorithm referred to herein as SmartColor, is also described in the form of a middleware for color management of user-interface components in OHMD. SmartColor uses color correction to provide three management strategies: correction, contrast, and show-up-on-contrast. Correction determines the alternate color which best preserves the original color. Contrast determines the color which best warranties text legibility while preserving as much of the original hue. Show-up-on-contrast makes a component visible when a related component does not have enough contrast to be legible. We describe the SmartColor's architecture and illustrate the color strategies for various types of display content.

Figure 2:
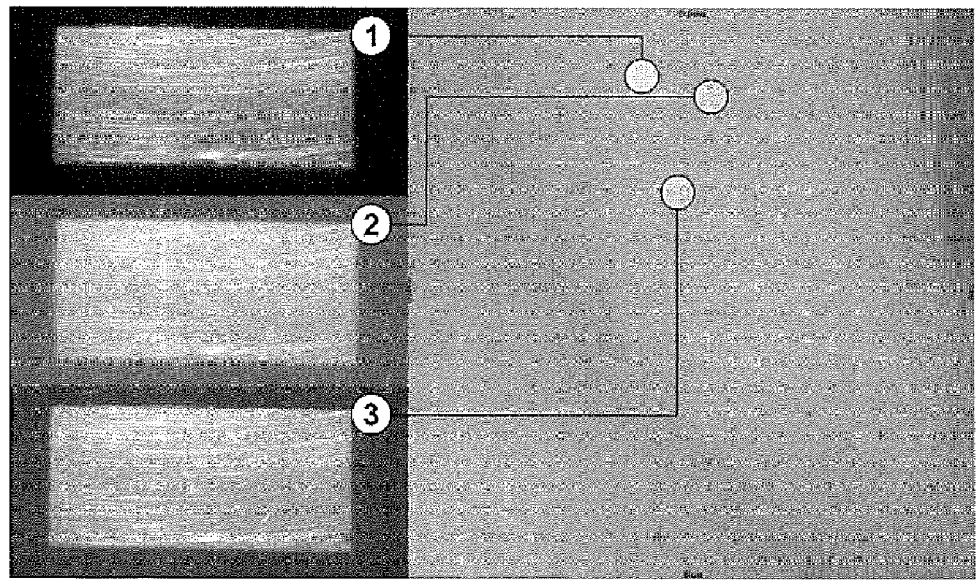
FIG. 2 left shows examples of color blending in an additive optical see-through display showing a yellow box over three different backgrounds: no background (black), red and blue and FIG. 2 right shows the corresponding shift in color1: the yellow square shifts toward orange when the background is red and toward green when the background is blue.

As noted above, color blending is the phenomenon where two colors mix to form a third. FIG. 2 left shows examples of color blending in an additive optical see-through display showing a yellow box over three different backgrounds: no background (black), red and blue. FIG. 2 right shows the corresponding shift in color1: the yellow square shifts toward orange when the background is red and toward green when the background is blue. Field studies with optical see-through displays reveal that the clarity and legibility of digital colors are affected by color blending, such that the colors in text and icons are altered (change in hue) or washed out (de-saturation) [Pingel and Clarke 2005]. These changes affect the user interface and can render it ineffective: e.g. text might turn unreadable when washed out, or color encoded information might lose their visual meaning.

Gabbard et al.[2010], studied such color changes in optical see-through displays by building an experimental test-bed and examining display (27 colors on the edge of the RBG gamut) and background colors (6 common outdoor colors—foliage, brick, sidewalk, pavement, white and no background). Their results show that high intensity backgrounds affect all display colors by pulling them towards white, and backgrounds of different hues pull all colors toward them. Gabbard et al. [2010] modeled the color blended and perceived by a user (CP) as a function of the light source (L1), the reflectance (RF) of a background object (B), the light emitted by the display (L3), the Interaction of both L1 and L3 in the display (ARD), and the human perception (HP). See equation 1:

$$CP=HP(AR_D(L_3, RF(L_1, B))) \qquad (1)$$

Figure 1:
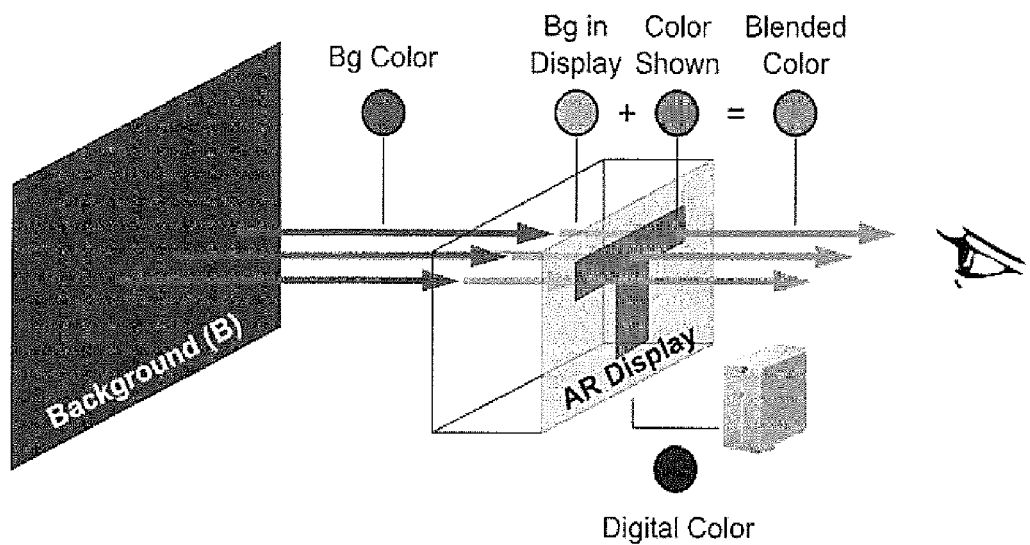
FIG. 1 is a schematic representing color blending including the render and material distortions for digital and background colors.
Figure 3:
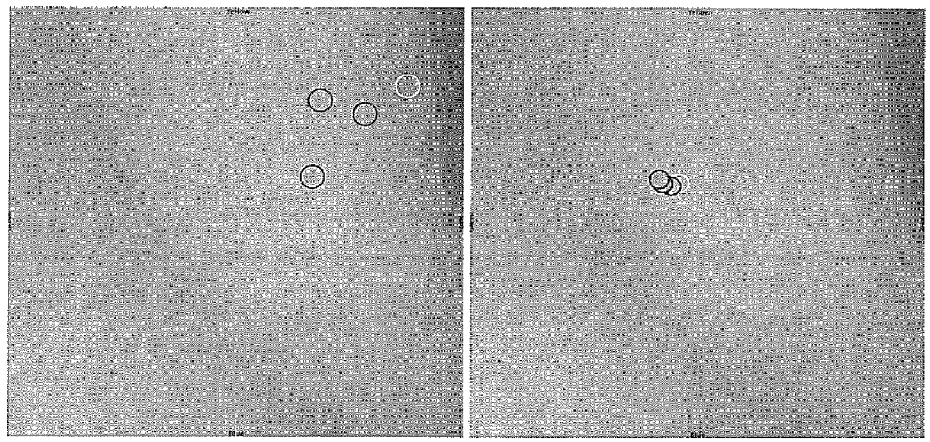
FIG. 3 left shows the color red (FF0000) as rendered by different displays and FIG. 3 right shows the foliage color as seen through different displays.

We take this model as a starting point and un-wrap the Interaction of colors on the display (ARD in equation 1) to account for two externally observable distortions: the render and material distortions. The render distortion is due to the fact that each display renders digital colors differently. FIG. 3 left shows the color red (FF0000) as rendered by different displays. FIG. 1 illustrates this distortion with the "digital color" and "color shown" circles. The material distortion is due to the display material's effect on the background color.

FIG. 3 right shows the foliage color as seen through different displays. FIG. 1 illustrates this distortion with the "bg color" and "bg in display" circles. In our formulation we unify the light and reflectance of the background (RF(L1,B)) into the single entity "background color". We turn the Interaction of light in the displays (ARD) into color addition. Moreover, we account for human perception (HP) by using the CIE XYZ and LAB color spaces which are based on human color perception. We model color blending as follows:

$$BlendedColor=frender(DC)+fmaterial(BC) \qquad (2)$$

Key to this model is the characterization of the frender and fmaterial distortion functions. The frender function describes the way a particular display shows a given digital color (DC). The fmaterial function describes the way the display material alters a background color (BC). From FIG. 3 we observe that display colors change more than background colors, and therefore this paper focuses on characterizing the frender function. We implement this function through the binned-profile method (see section 5). Characterizing the fmaterial function requires capturing real world backgrounds [Hong et al. 2001] and creating a model of how the display material affects them (hue and luminance—see section 6 for more details). Given its complexity the fmaterial function is out of the scope of this paper and instead we used objective measures of how background colors are seen in front and through the display.

Researchers have long discussed color blending as a significant per a hand in front of the display [Pingel and Clarke 2005]. Both strategies require users to switch context between their activity and the display which often results in missing important information. Strategies like these inspired research into ways to improve display clarity. A simple approach is to dynamically increase the intensity of the digital content (mentioned in [Kiyokawa et al. 2001]), however such solution is not always efficient [Kerr et al. 2011]. Leykin and Tuceryan [2004] capture the field of view of the user and classify it into zones where digital text would be readable or unreadable. In a similar fashion, Tanaka et al.[2008] developed a layout system that relocates digital content to the darker areas of the display taking into account restrictions like ordering of the components.

Color blending also affects the effective occlusion of physical objects by digital content, an important issue when the real environment is enhanced with 3D virtual objects that are intended to look real, such as in architectonical previewing. Without effective occlusion, the virtual object is perceived as translucent and unreal [Cakmakci et al. 2004] and can confuse users [Sekuler and Palmer 1992]. Solving the occlusion problem keeps digital content from being affected by the physical objects in the background, thus solving color blending. The main approach to occlusion has been to stop the light coming from the background by enhancing head-mounted displays with spatial light modulation (SLM) devices [Cakmakci et al. 2004][Kiyokawa at al. 2003][2002][Zhou et al. 2007]. In this approach a black/white depth mask of the scene is generated with the black pixels covering the area where digital content is not to mix with the background light. Therefore, digital colors projected on the black areas are seen in their original hue and lightness. Another solution is to control the illumination of the physical objects in a way that areas behind digital content remain in the dark. Noda et al. [1999] explored this approach by constraining physical objects to a dark room, while Bimber and Frolich [2002] implement it via occlusion shadows in a virtual showcase. Finally, occlusion can be fixed by placing parts of the optical system behind the augmented object, such as Inami et al.'s [2000] usage of retro-reflective material as optical camouflage.

Our approach differs from these solutions as we aim not to change the location of user interface elements or to add new hardware components to the optical see-through display. Rather we seek to manipulate the color shown by the display; an approach known as colorimetric compensation or color correction.

Researchers in the field of projector-based spatial AR studied color correction as a way to enable projections on non-white and textured surfaces. Nayar et al.[2003]proposed a camera-based radiometric calibration model to compute the relation between the digital image and the projection on a textured surface. Their approach requires a calibration phase where known patterns are projected on the projection surface and the resulting blended images are processed to obtain compensation matrices. Bimber et al. [2005] extended the range of projectable color by using a transparent film and multiple projectors, taking into account the reflectance and absorption of the digital color by the projection surface. Grossberg et al. [2004] extended the radiometric model to include ambient light. While these works deal primarily in the device dependent RGB space, others achieved higher correction accuracy by working on the device independent CIE XYZ color space[Ashdown et al. 2006][Menk and Koch 2011].

Weiland et al. [2009] applied color correction to optical see-through displays. Their system is based on [Bimber et al. 2005] with a camera on top of the display to capture the background. Correction is achieved by subtracting the camera-captured background color from the display color. Color subtraction ignores the render and material distortions (similar to the direct method), and often yields colors outside the RGB space. In this paper we continue this line of work but move away from color subtraction. We focus on the actual colors a display can show and background colors as seen through the display. Our BP-based color correction uses a best-fit approach to find the display color which, upon blending, comes closest to the desired display color. Finally, we use the device independent CIE XYZ and CIE LAB color spaces, extend our study to both projector-based and T-OLED (Transparent Organic Light Emitting Diode) displays, and present results quantitatively.

Figure 4:
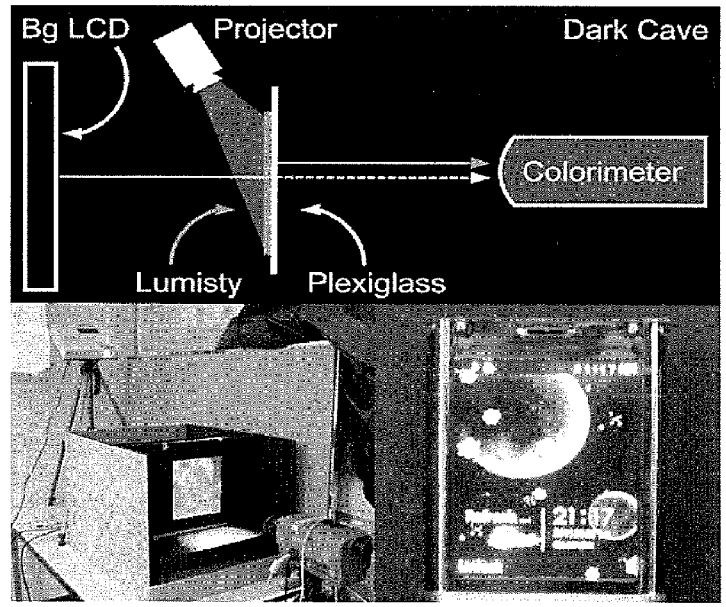
FIG. 4 show our experimental test-bed built (1) to generate various background colors, (2) to show display colors on multiple optical see-through displays, and (3) to measure color blending.

FIG. 4 shows our experimental test-bed built (1) to generate various background colors, (2) to show display colors on multiple optical see-through displays, and (3) to measure color blending.

To generate different backgrounds we use a Dell U2312HM VGA LCD display calibrated at the standard D65 white point, the standard outdoors lighting condition. This approach to generating background colors is limited by the color gamut of the LCD. Our test-bed differs from previous systems [Gabbard et al. 2010] which prioritize the capacity to obtain background colors as seen in nature. Our design prioritizes the capacity to automatically produce a wide variety of background colors. For our experiments we used background colors from the ColorChecker Color Rendition Chart [McCamy and Davidson 1976] because they mimic colors of everyday natural objects like skin, foliage and flowers. FIG. 6A shows the difference between theoretical background colors and how our test-bed produces them.

Our test-bed works with three optical see-through displays: two projector-based and one transparent OLED. The projector-based displays use a 3 mm transparent acrylic surface covered with a Lumisty MFY 2555 film and one of the two projectors at 40°. The first projector is an Epson 1705 with 2200 lumens, hereafter called the p2200 display. The second projector is an Epson VS35ow with 3700 lumens, hereafter called the p3700 display. For the transparent OLED display we used a Lenovo 5800 phone [Lenovo 2013] which has a 240×320 transparent OLED display at 167 ppi, hereafter called the T-OLED display. The T-OLED display is covered in acrylic and is 9 mm thick. The test-bed holds the displays at 20 cm in front of the background LCD.

To examine background and display colors and the resulting color blends we used the notations of the Commislon Internationale de l'Éclairage (CIE) color model. We use the CIE 1931 XYZ color space for color measurement and addition required by our model. The XYZ color space resembles the working of the human visual system which is more sensitive to greens and therefore not a perceptually uniform color space. We used the CIE 1976 LAB color space, a perceptually uniform color space, to calculate the perceptual difference between colors; e.g. the distance between a color and its shift when blended, or the distance between a prediction and the measured blend.

TABLE 1

White points for all three displays.

|  |  | p2200 | p3700 | T-OLED |
|---|---|---|---|---|
| No BG | X | 0.2655720 | 0.9504 | 0.383264 |
|  | Y | 0.282182 | 1 | 0.395001 |
|  | Z | 0.481033 | 1.0888 | 0.369982 |
| White BG | X | 0.9504 | 0.9504 | 0.724775 |
|  | Y | 0.990041 | 1 | 0.759896 |
|  | Z | 1.0888 | 1.0888 | 0.727336 |

To collect data we used a Konica Minolta CS-200 luminance and color meter at 0.2 degrees (standard observer angle). The colorimeter measures colors in the XYZ color space. In order to convert these values into normalized LAB we use the measured white point of the displays involved as explained by Gabbard et al. [2010]. For both p2200 and p3700 displays we measured the XYZ white points of the Lumisty surface at 5 different points: one near the each of the display's four corners and one in the center. For both projectors all measurements of the white point remained the same. We located the colorimeter at 20 cm away from the see-through display and pointing at the center. After calibrating the background LCD to D65 (measured at 0.9504, 1, 1.0888) we measured the following two combinations of the white point per display and recorded the average of 100 measures per combination (see Table 1):

See-through showing white and bg LCD turned off.
Both see-through and bg LCD showing white.

The displays and the colorimeter were connected to the same controlling computer and were kept away from the ambient light by a light enclosure (represented in FIG. 4 as the dark cave).

The Binned Profile Method

In order to build a reliable color correction system, it is necessary to have an accurate model of color blending. Equation 2 explains our model and this section presents a method to implement the frender function. This function receives the color the display wants to show as a parameter and return the color the display actually shows.

Figures 5, 6:
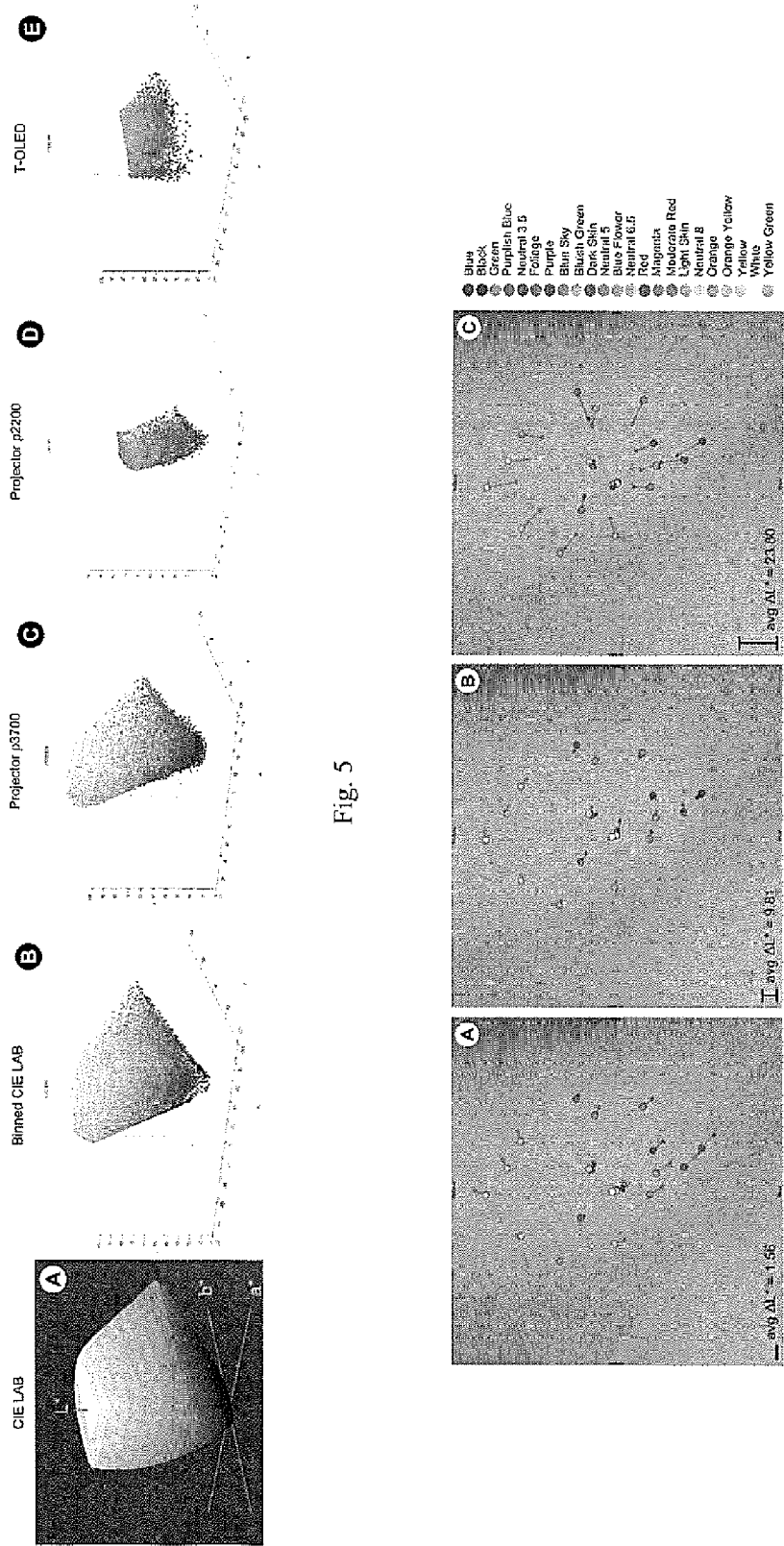
FIGS. 5 A-B shows the sRGB gamut on the CIE LAB color space and the binned result while FIGS. 5 C-E presents the display profiles, with the p3700 almost matching color capacity of sRGB (C), and considerable reductions of color capacity for the p2200 (D) and T-OLED displays (E).

We propose binned-profiles (BP), a method which divides the sRGB color space (over 16 million colors) into a smaller set of 8376 perceptually different bins. To create the bins we translate the sRGB gamut into the CIE LAB color space and divided it into bins of 5×5×5—an approach proposed by Heer and Stone [2012]. This approach guaranties all colors inside a bin are within one Just Noticeable Difference (1 JND≈2.3 In Euclidean distance), such that they are perceived as the same color by a human observer [Mahy et al. 1994]. FIG. 5 A-B shows the sRGB gamut on the CIE LAB color space and the binned result. Then, we measured how each bin is rendered by each of our three displays (8376 colors) on a black background. Each color was captured using the colorimeter in XYZ and we transferred it into the CIE LAB color space using the reference white points given in Table 1 (top row). Based on these measurements we created a color profile for each display. FIG. 5 C-E presents the display profiles, with the p3700 almost matching color capacity of sRGB (C), and considerable reductions of color capacity for the p2200 (D) and T-OLED displays (E).

```
Algorithm 1 Binned-Profile based prediction algorithm
    procedure BP-PREDICTION (Display,Foreground,
    Background)
        BinForeground = findBin(Foreground)
        DispForeground=lookup(Display,Binoreground)
        Prediction=addXY Z(DispForeground,Background)
        returnPrediction
    end procedure
```

Color blending prediction based on the BP method consists of using the display profile as a lookup table (see Algorithm 1). To find out how a display represents a digital color we first translate the color to its closest bin in LAB space and use it as a key in the profile lookup table. The color associated with the key is the one the display actually shows (Color Shown in FIG. 1). We use this color in our color blending model (equation 2): we add it to the background in CIE XYZ and obtain the color blend.

Binned-Profile Validation

In order to assess the validity of BP method in our color blending model, we measure the error of the prediction and compare it to the predictions using the direct method (DM) and three chromatic adaptation transformation (CAT) methods. Error is measured as the difference between the predicted and the measured color blend (computed in CIE LAB). When using the direct method the digital color is simply added to the background. CAT are established methods to estimate the colors a display can render based on the brightest white it can emit. In other words, CAT could potentially account for the frender distortion function. CAT is based on matrices and researchers have proposed CAT methods which rely on different matrices. When using the CAT methods we transformed the display color using the respective CAT matrix before adding it to the background. We chose three popular CAT methods: Bradford, Von Kries [Susstrunk et al. 2000], and XYZ Scaling [Lindbloom 2013]. We selected those methods due to their popularity in the literature.

As discussed before, measuring the background color and characterizing the effect of the material distortion (fmaterial function) is out of the scope of this paper. We work under the assumption that such color is available at a per-pixel level. However, to explore the impact of the material distortion, we compare two possible background detection implementations: plain and adjusted. The background color is plain if the system ignores the effect of the distortion and feeds it to the model as it is measured, so that fmaterial(background)= background. The background color is adjusted if the system accounts for the material distortion and transforms it before feeding it to the model (Bg in Display, FIG. 1).

We considered 23 colors of the ColorChecker Color Rendition Chart [McCamy and Davidson 1976] at D65, a representative set of naturally occurring colors (the 24th ColorChecker color is outside of the sRGB gamut). We measured the colors as shown by the background LCD. These values correspond to the plain background configuration (see FIG. 6A). We also measured how each background color would be seen through the see-through displays (see FIG. 6B-C). These values correspond to the adjusted background configuration for each display. The measured adjusted values show displacement in 'a' and 'b', but also a considerable reduction of L; this is due to the display material absorbing some of the light from the background (the material distortion). It is to be noted that there was a significant impact of the T-OLED display on all axes of the background color.

We used the 23 ColorChecker backgrounds against 838 random display colors (10% of the size of the bin). We measured the resulting blend of each pair for each of our three displays capturing a total of 23×838=19, 274 measurements per display and 19, 274×3=57, 822 measurements in total. We converted the blending measurements into CIE LAB using the white points from Table 1. We predicted the resulting color blend for each combination of display color method (5 methods), background configuration (2 configurations) and display (3 displays). We obtained 5×2=10 predictions per blending, 5×2×23×838=192, 740 predictions per display, for a total of 192, 740×3=578, 220. We computed the prediction error by calculating the Euclidean distance in LAB color space between each prediction and the actual measurement.

Figure 7:
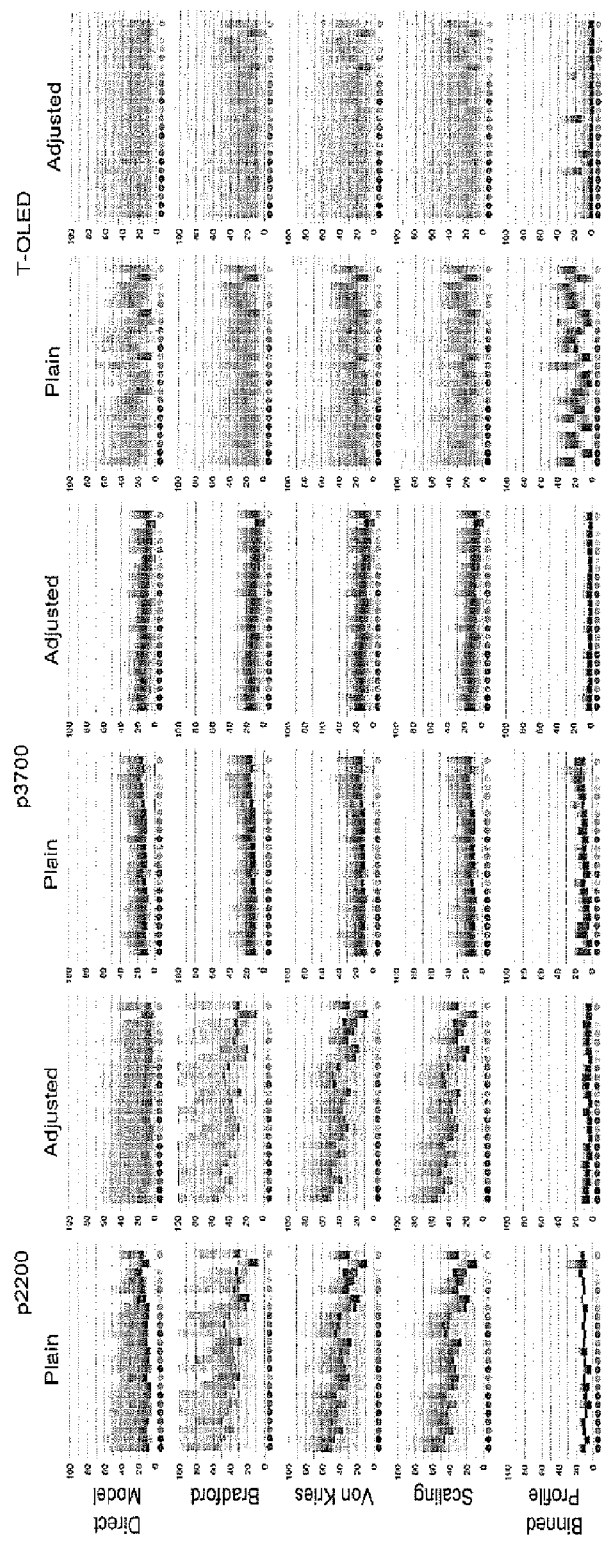
FIG. 7 summarizes the results for our prediction study using vertical histograms.

FIG. 7 summarizes the results for our prediction study using vertical histograms. Each histogram represents the prediction error of all display colors for a given background: lower error (zero difference in LAB) is the bottom of the graph and color saturation represents the height of the histogram. A visual inspection of the results shows that for all conditions the CAT-based predictions performed worst, with a high spread in error and an average far from optimal (In the case of the p3700 display, all CAT-based predictions perform the same because the white point of this display is exactly D65). Thus we exclude the CAT methods from the rest of this analysis. Results did not have a normal distribution and therefore we used the Kruskal-Wallis H test for non-parametric data. Table 2 shows the results of our analysis. Results showed a main effect of display, method and material configuration. There were also significant interaction effects between all independent variables.

TABLE 2

Kruskal-Wallis test for prediction error.

| Display | Method | Bg-Type | df | $\chi^2$ | Sig |
|---|---|---|---|---|---|
| X | — | — | 2 | 32152 | <0.001 |
| — | X | — | 1 | 698210 | <0.001 |
| — | — | X | 1 | 25745 | <0.001 |
| — | X | X | 3 | 104717 | <0.001 |
| X | X | — | 5 | 101643 | <0.001 |
| X | — | X | 5 | 60583 | <0.001 |
| X | X | X | 11 | 142259 | <0.001 |
| Post | | Hoc | | | |
| — | Both | Adjusted | 1 | 59437 | <0.001 |
| — | Both | Plain | 1 | 21613 | <0.001 |
| — | BP | Both | 1 | 52494 | <0.001 |
| — | DM | Both | 1 | 2157 | <0.001 |

For the p2200 display BP-based prediction performed best in each background configuration (plain: 10.01-adjusted: 4.98). DM-based prediction presented only a small difference between background configurations (plain: 22.71-adjusted: 22.06). We observe a similar pattern for the p3700 display where BP-based prediction has lower error for both background configurations (plain: 10.28-adjusted: 2.77) than the DM-based prediction (plain: 17.5 adjusted: 13.67). Finally, when applied to the T-OLED display BP-based prediction also performed better (plain: 25.63-adjusted: 8.24) than DM-based prediction (plain: 34.37-adjusted: 32.26).

Figure 8:
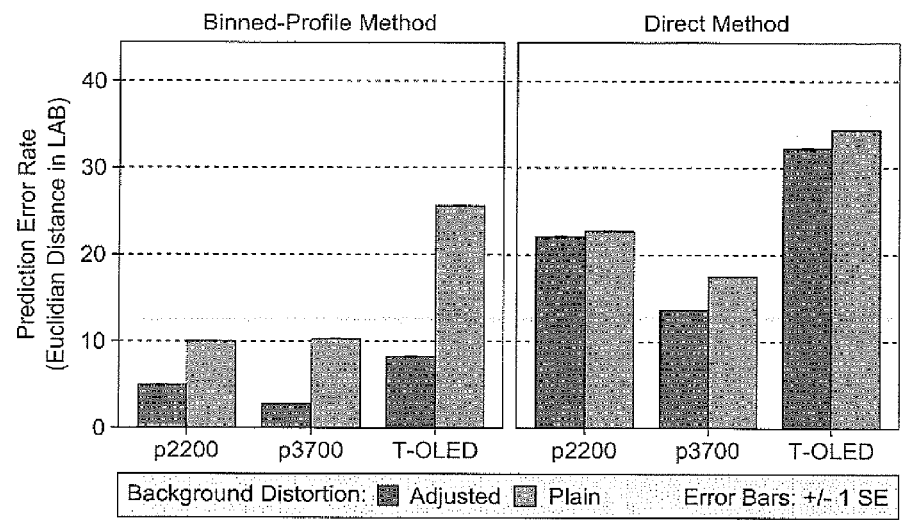
FIG. 8 shows that BP-based predictions outperform all other methods we tested across the 23 backgrounds.

Overall, FIG. 8 shows that BP-based predictions outperform all other methods we tested across the 23 backgrounds. Moreover, this lower error rate exists for both the plain and adjusted background configurations. Our results confirm the importance of the render distortion (how the display represents digital color) as the dominant factor for color blending. More importantly, our results highlight the limitations of the direct method (ignoring the display distortion) and the Inadequacy of any of the three CAT methods we tested. Finally, results show that considering the material distortion decreases prediction error, reducing the error by more than half in all displays when using the BP method. For the p3700 display pre-diction error using the BP method with the adjusted background was 2.77 or about 1 JND.

Color Correction

```
Algorithm 2 Binned-Profile color correction algorithm.
    procedure BP-PRESERVATION (Display,Foreground,
    Background)
        BinForeground = findBin(Foreground)
        DispForeground = lookup(Display,BinForeground)
        Error = INFINITY
        for each Color in Display
            Prediction = addXYZ(Color, Background)
            TmpError=distance(Prediction,DispForeground)
            if TmpError<Error
            Error = TmpError
            ColorToShow= Color
        CorrectedColor=revLookup(Display,ColorToShow)
        end for
        returnCorrectedColor
    end procedure
```

Color correction aims at finding an alternative color which, upon mixing with the background, results with the color originally desired by the designer. In this section we propose a color correction approach for optical see-through displays based on the BP method. When correcting a color for a given background, the system predicts how each color of that particular display's profile blends with the background. Then the system finds the prediction which comes closest to the originally intended color—a best fit approach. This algorithm is described in Algorithm 2: First, the display color (Foreground—the sRGB color the system wants to paint on the screen) is mapped to the closest bin (BinForeground—see FIG. 5B) with respect to the display type (Display). Second, based on the display profile, the bin color is mapped to its actual representation (DispForeground—the way such bin is actually shown by the display). Third, for each bin on the display profile, the system predicts how it blends with the background (Prediction) and calculates the distance between the prediction and the display color (TmpError). The system selects the prediction with the lowest error (ColorToShow) and converts it to the corresponding binned color that produces it via a reverse lookup (CorrectedColor). Finally the display shows the corrected color.

It's important to note that our algorithm aims at correcting the color the display actually shows, rather than the application defined foreground. Moreover, our algorithm avoids using color subtraction (CorrectedColor=foreground-background) for two reasons: first, similarly to the direct model for color prediction, color subtraction ignores the display profile leading to an incorrect target for correction. Second, because color subtraction often results in values which are outside the display profile.

The goal of this study was to explore how well the BP-based correction algorithm performs for different common backgrounds. We applied BP-based color correction on the p3700, p2200 and T-OLED see-through displays for the 23 ColorCheck adjusted backgrounds. We selected 200 random display colors for each background, corrected them, and measured resulting color blend amounting to 23×200=4600 measures per display. We collected a total of 23×200×3=13,800 measurements for all three displays. We then calculate correction error as the difference between the measured blend and the intended display color.

Figure 9:
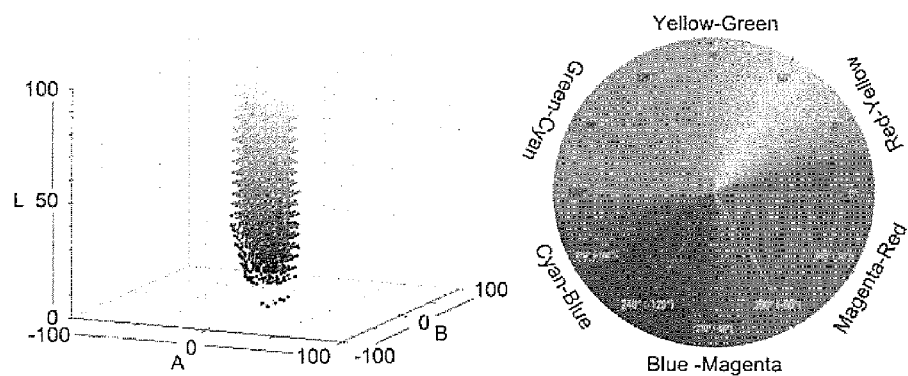
FIG. 9 shows (left) the dark and light neutrals, and (right) the 6 chromatic regions.
Figure 10:
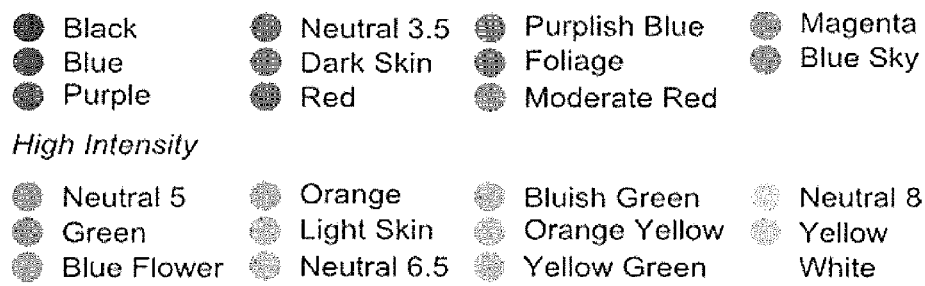
FIG. 10 shows the background color groups.

We took a two-step approach to analyzing the collected data. In the first step we looked at the general correction capacity of the algorithm for the three displays. In the second step we focused on the p3700 display as it can reproduce a wider variety of colors (see FIG. 5C-E for the color profile of each display). For this display we grouped the display colors into 10 groups: dark colors (L<50), light colors (L>=50), dark and light neutrals (neutrals are located within 10 JNDs of the L axis), and 6 chromatic regions according to the color circle. FIG. 9 shows (left) the dark and light neutrals, and (right) the 6 chromatic regions. Note that each display color might belong to more than one group. Similarly, we divided the ColorCheck backgrounds into high intensity colors (L>=50) resembling daylight conditions like white and yellows, and low intensity colors (L<50) resembling night conditions like black and blue. FIG. 10 shows the background color groups.

Figure 11:
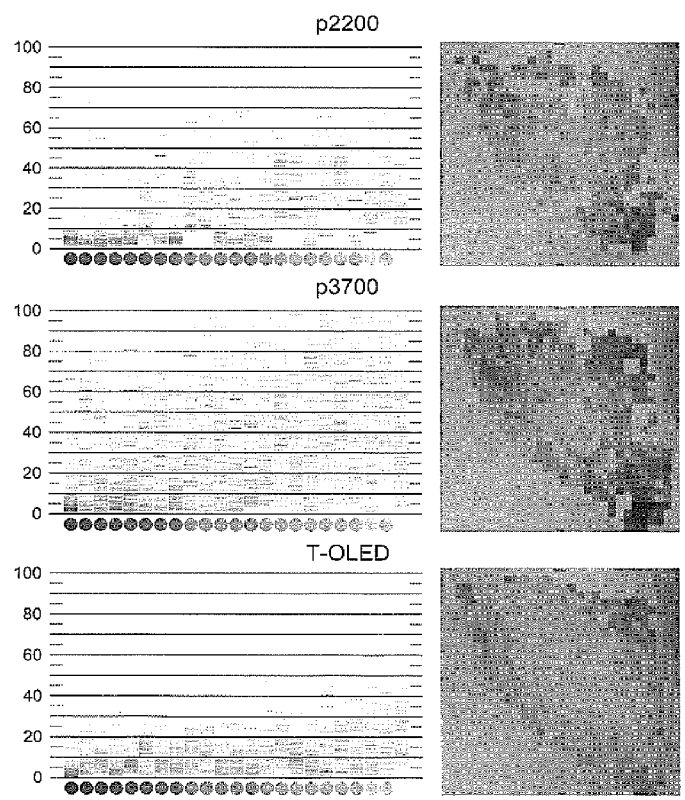
FIG. 11 shows the general correction results for all background and display colors on the three displays.

For analyzing the correction results we used vertical histograms together with color heat-maps (see FIG. 11—Top-Right). The color heat-map reveals how well our algorithm corrects regions of the LAB color space for a given set of background colors. The color heat-map divides the LAB D65 slice into a 30×30 grid. Each grid cell is colored in blue (0000FF) with the opacity moving from 0 to 1, where the opacity is relative to the average correction error (ranging from 0 to 100+) of all colors in that cell. If the sample did not contain corrections for display colors in a given cell, the cell has no blue box. If the sample contains corrections for a given cell, the error of each correction is calculated and averaged with the rest. Cells in which colors are well corrected (lower correction error) in average result in a faint blue. Cells in which colors cannot be corrected in average (higher correction error) result in a dark blue. FIG. 11 shows the general correction results for all background and display colors on the three displays.

A visual Inspection of the results reveals that correction works better for low luminosity backgrounds (toward the left of the vertical histogram) for all three displays. Results also show corrections have lower error for the p2200 and T-OLED displays (fainter blue boxes in the heat-map and more concentrated vertical histograms). This could be explained by the limited range of colors these displays render (concentrated in a small volume in the LAB color space) and therefore the distance between the measured correction and the target color will always be small. Conversely, corrections have higher error for the p3700 display, which can be explained by its wider range of colors (occupying a larger volume in the LAB color space) and therefore the distance between the measured correction and the target is larger. Finally, display colors toward the edge of the gamut (red, green, blue) generally had a higher error rate when compared to the colors located in the central region of the gamut.

Figure 12:
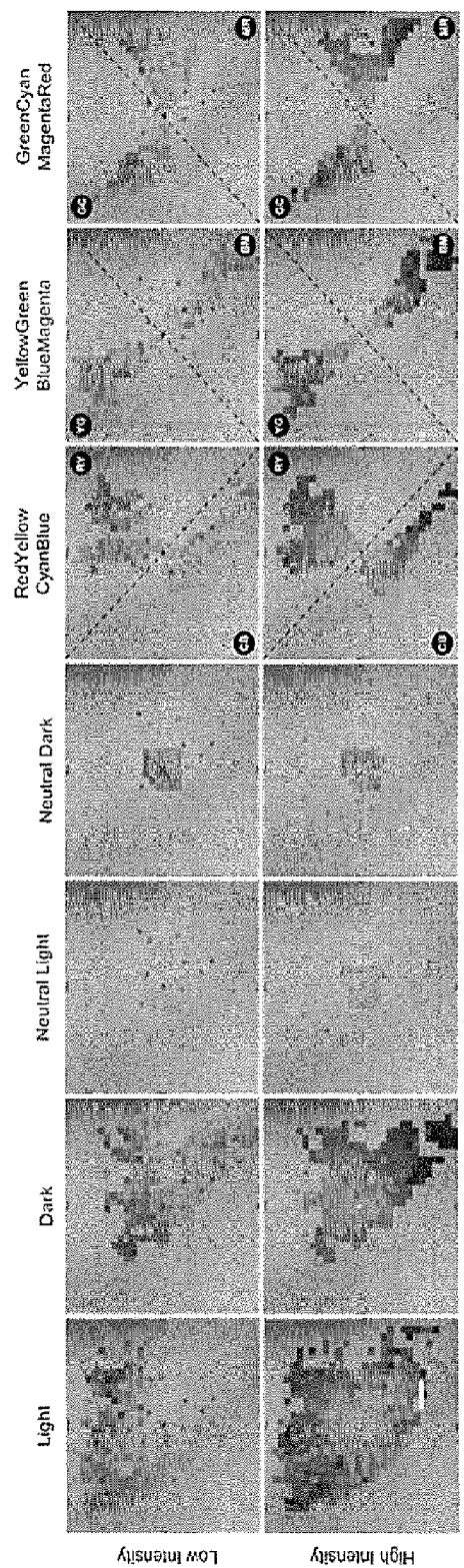
FIG. 12 shows the correction results for the p3700 display according to high and low intensity backgrounds and the different display color groups.

FIG. 12 shows the correction results for the p3700 display according to high and low intensity backgrounds and the different display color groups. A visual inspection of FIG. 12 shows that BP-based color correction for the p3700 display works best on low intensity (dark) backgrounds. This is the case for all groups of display colors with a better performance for light display colors. For high intensity (light) backgrounds we observed a decreased correction capacity across all display colors, and a particularly acute decrease on dark display colors and on the outer areas of all color groups (more saturated colors). We also observed that the region of neutral colors might be larger than we originally thought as similar levels of correction error can be found at a bigger radius. For both background conditions the light neutrals present lighter heat-maps.

TABLE 3

Kruskal-Wallis test for correction error

| Region | BG | Display | Neut | df | $\chi^2$ | Sig. |
|---|---|---|---|---|---|---|
| All | — | — | — | 5 | 23.9 | <0.001 |
| — | Both | — | — | 1 | 1056.5 | <0.001 |
| — | — | Both | — | 1 | 761.9 | <0.001 |
| — | — | — | Both | 1 | 46.5 | <0.001 |
| Post Hoc | | | | | | |
| — | Low | Both | — | 1 | 381.7 | <0.001 |
| — | High | Both | — | 1 | 651.1 | <0.001 |
| — | Both | Dark | — | 1 | 684.2 | <0.001 |
| — | Both | Light | — | 1 | 685.4 | <0.001 |
| — | Low | — | Both | 1 | 6.3 | <0.05 |
| — | High | — | Both | 1 | 66 | <0.001 |
| All | Both | Both | — | 23 | 1979 | <0.001 |

Figure 13:
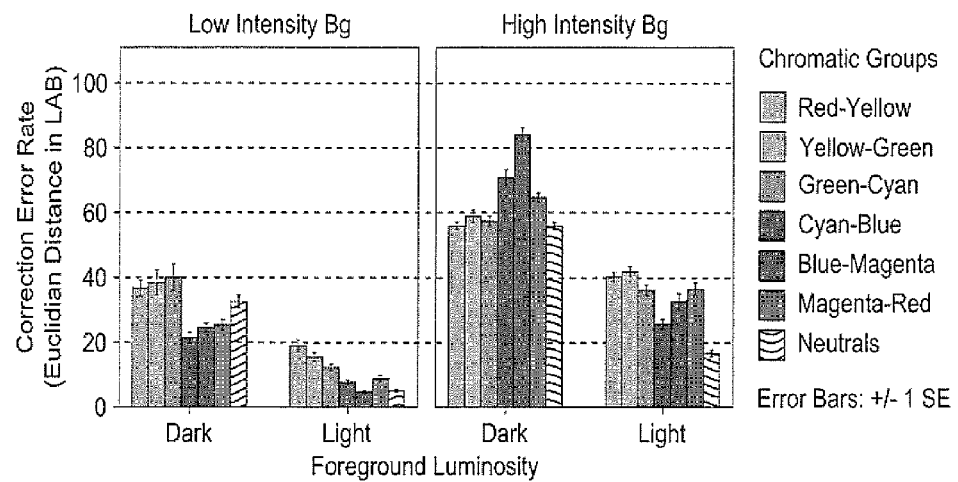
FIG. 13 gives a quantitative view of correction error for the 6 chromatic regions and the neutrals on the p3700 display.

FIG. 13 gives a quantitative view of correction error for the 6 chromatic regions and the neutrals on the p3700 display. The data is not normally distributed and therefore we analyzed it using the Kruskal-Wallls H test (see Table 3). The results show there is a significant difference between corrections in all chromatic regions, between both background intensities, and between both display color luminosity (light and dark color) conditions ($p<0.001$). Post-hoc tests show there was a significant difference between all possible combinations of conditions (all $p<0.05$). Results show all colors are better corrected in low intensity backgrounds. However, neutral colors are always corrected significantly better than non-neutrals. In general corrections had lower error for low intensity backgrounds at 21.23 (9.2 JNDs), for light foregrounds at 23.46 (10 JNDs), and the CyanBlue region at 31.49 (13.6 JNDs).

Overall, results show that colors can be better corrected for displays with a lower color capacity as we have shown for the p2200 and T-OLED displays. The trade-off is that such displays cannot really convey realistic color experiences due to their limited color profiles. More interesting are the results for the p3700 display, a display with a larger color profile as you would expect in a general purpose multimedia device. This results show that BP-based color correction can achieve low correction error rates for low intensity backgrounds (such as the ones in dark environments or night conditions), particularly for light colors on the display.

Figure 14:
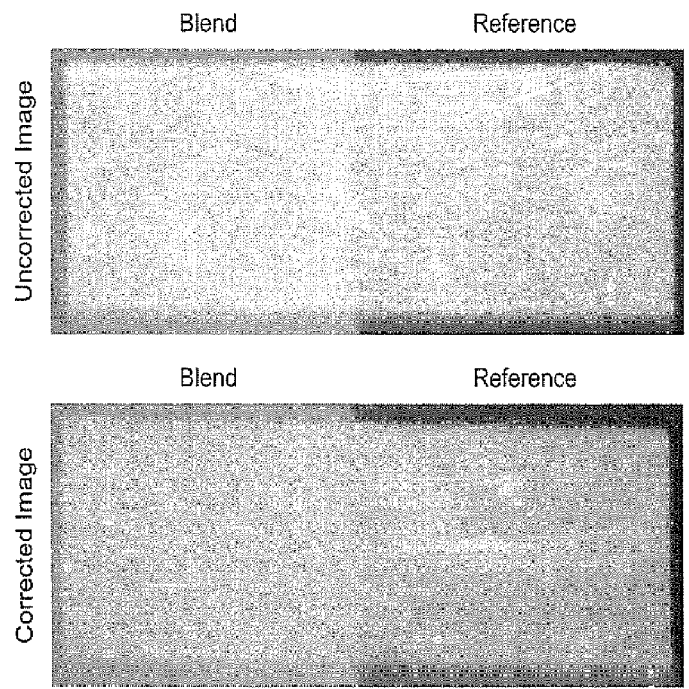
FIG. 14 shows a working example of BP-based color correction, where digital color yellow is corrected for moderate red background.

Moreover, for high intensity backgrounds (such as the ones in daylight conditions) the BP-method achieves its best corrections for light display colors, particularly for the neutrals and the colors of the Cyan-Blue region. Finally, color correction presents a consistently high error rate when correcting dark display colors, with opposite trends depending on the background. For low intensity backgrounds Cyan-Blue, Blue-Magenta and Magenta-Red are corrected best, however, for high intensity backgrounds it is Red-Yellow, Yellow-Green, Green-Cyan and the neutrals that are corrected best. FIG. 14 shows a working example of BP-based color correction, where digital color yellow is corrected for moderate red background.

Implementing BP-based color correction on additive optical see-through displays requires a display profile and a mechanism to determine how background colors interact with the individual pixels of the display. Ideally, display manufacturers should provide such profile and make it available for developers. In a head-mounted display, the system can use a digital camera for a pixel level mapping of the background and the display image such as in [Bimber et al. 2005][Weiland et al. 2009]. However, accurate color measurement via a digital camera itself a complex task [Hong et al. 2001], especially for changing light conditions like the outdoors. A correctly calibrated camera can provide basic background color measurements. For a window-size transparent display such camera-based method is not adequate as it is impossible to locate a camera at the user's vantage point. In such case the system could rely on a 3D model of the background scene with projections of the lighting for a given perspective. Both solutions can support color correction for the plain background condition (although the second is less accurate). However, neither of these configurations accounts for the material distortion of our model.

Figure 15:
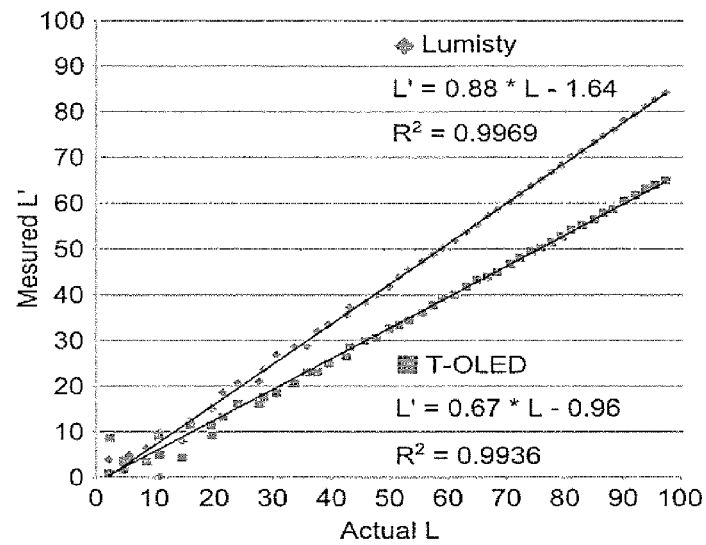
FIG. 15 shows a preliminary assessment of 100 colors on the L axis in which the amount of L absorbed by the display material follows a linear function.
Figure 16:
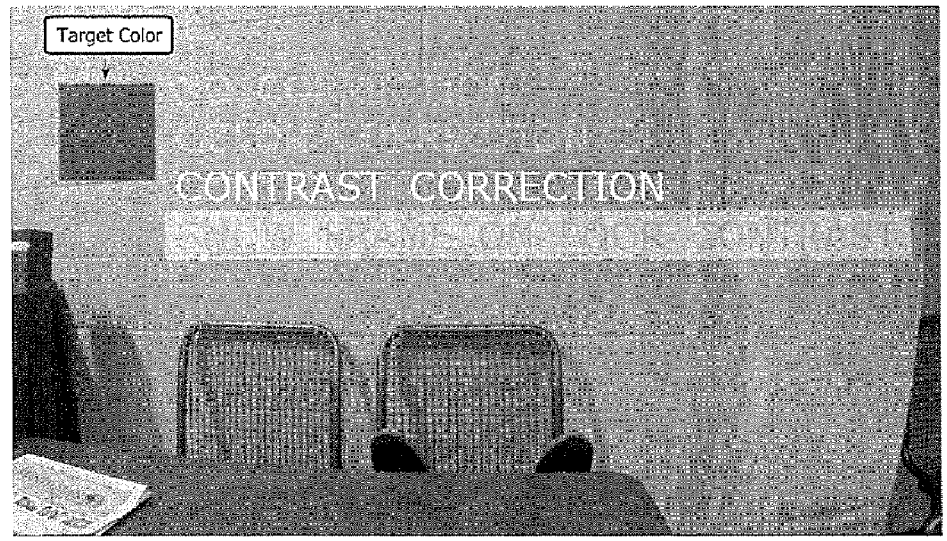
FIG. 16 illustrates different color manipulation strategies for text labels.

To account for the material distortion the system should accurately predict how a given background is modified by the display material. A preliminary assessment of 100 colors on the L axis shows the amount of L absorbed by the display material might follow a linear function (FIG. 15, $R^2 \approx 1$ showing perfect linearity). The effect of the display material on L is significant, particularly for the T-OLED for which L is reduced by almost half. Further work is required to confirm this trend and to characterize the impact on the hue (A and B).

We showed an optical see-through display affects color blending through its color profile and its impact on background colors. Limited color profiles such as in the p2200 and T-OLED displays guaranty better BP-based color correction. However, such limited color displays provide a limited color experience for applications like video or game playing. On the other side, full color displays like our p3700 could provide richer color experiences at the cost of less correction accuracy. A promising exploration venue is full color displays with a lower level of transparency. Lower transparency darkens background colors which, as we observed in the correction study in T-OLED display, might be better suited for color correction. The degree of display opacity poses a challenge for how much accessibility and clarity is needed for either the background or the display content, and remains an open question. Ideally, an optical see-through display should provide a way to control the level of transparency at a pixel level, as explored by [Klyokawa et al. 2003]. A rendering pipeline could rely on BP-based color correction for darker backgrounds and block background light as the correction algorithm approaches its limits (i.e., when high intensity background colors makes the display color uncorrectable).

A major result from our correction study is that, with BP-based color correction, designers can use light neutral colors for information that needs to be preserved best— especially in environments of high luminosity like daytime outdoors. Should more hue be needed, designers can use light colors in the CyanBlue region. Dark colors should be avoided for text and color-encoded information, although they can still be used for creating good contrast (for e.g., text legibility). It is to be noted that the focus of this paper is on preserving digital color on see-through display rather than contrast, which is a design issue.

An important corollary is that even with BP-based color correction, not all display colors can be corrected. The degree by which a display color can be corrected depends to a great extent on the background color. Therefore, interface designers should study the intended normal usage conditions of their application (e.g. outdoors, forest or night time), in order to collect prevalent background colors. Based on such set, designers can analyze how correctable are alternative color palettes on such backgrounds and stick with the one palette which can be corrected the best.

In summary, the first aspect of the invention described above presents a color correction approach for additive optical see-through displays based on two color distortions introduced by the display: the render and material distortions. The above disclosure proposes a color blending model that accounts for these two distortions and addresses the render distortion by proposing the Binned-Profile (BP) method. The BP method describes the way a particular display renders a representative set of colors of the sRGB gamut. For the second distortion we used colorimetric measurements of how background colors are seen through the display material. We validated the BP-method by measuring the accuracy of its color blend predictions on three different optical see-through displays against other known methods. The results showed that the BP method outperforms other methods, and that this first distortion is the main factor to address for accurate color blend predictions.

The color correction algorithm is based on the BP-method and has been investigated with regard to its correction capacity using a wide variety of background and display colors for three displays. Results showed BP-based color correction works best for displays with low color capacity. For displays with high color capacity results show that colors can be better corrected for low intensity backgrounds, and that for high intensity backgrounds light neutrals and light CyanBlue colors can be corrected best. We reported our results both graphically (through vertical histograms and heat-maps) and quantitatively.

Turning now more generally again to the color-blending problem, various ad-hoc solutions to color blending are known which include users placing their hand in front of the display or directing their head to darker backgrounds [18]. In the following section we cover hardware and software solutions to color blending.

Hardware-based solutions are normally referred to as occlusion support in the OHMD literature. Occlusion support contemplates situations where virtual objects occlude real-world objects. The counterpart, mutual occlusion, Includes cases where real-world objects can also occlude the virtual object.

To provide occlusion support the basic approach consists on augmenting the optical element of the OHMD with the capacity of blocking background light at the pixel level. This is achieved using spatial-light modulators (SLM) [1][5][8].

For each point on the display, the graphics driver generates the colored pixels which are to be shown to the user and an equivalent opacity mask which is applied to the background light. The opacity mask effectively blocks the background colors and leaves the colored pixels on a black background. This approach uses optical elements to redirect the background and display lights through the appropriate optical pathways. This implies that these systems can get to be large and Impractical for everyday use [1][819]. Gao et al. achieved smaller sizes using curved lenses [5][6].

Malmone et al. [14] presented an alternative without the need to manipulate optical pathways. Their smaller device uses stacked LCD panels and a shutter in two consecutive modes. In the first mode, the shutter blocks the entire background light while the LCD shows the colored content by filtering white light from an embedded backlight source. In the second mode, the shutter lets background light through and the LCD blocks it on the pixels where it previously showed content. By quickly switching between the two modes users get the illusion of occluded virtual content. This is a promising approach and its realization depends on the availability of high frequency (>480 Hz) and highly transparent LCD displays. Smithwlck et al. built a closely related solution for window-size transparent displays [21].

Software-based solutions seek to change properties of the digital content in order to minimize color blending, particularly for text-readability. A captured image of the background scene is analyzed. A simple solution is to increase the intensity of the digital text (mentioned in [8]) according to the background objects in the vicinity, however this is limited when backgrounds are bright. A system can also capture the user's background, classify it into zones where digital text would be readable or unreadable, and relocate content to the readable regions [12]. Automatic relocation can take into account restrictions such as ordering of components [23].

Another alternative is to compensate the changes in color by means of color correction. Researchers have developed color correction techniques largely focused on projection systems for spatial augmented reality (SAR) applications [15]. For example Bimber et al. explored color correction in projection-based transparent-display showcases [1] using surface radiance measures, 3D models of the world and the possibility to change the real-world illumination. OHMDs do not have all these capabilities and therefore the projection-based approaches do not directly transfer.

Little research exists into how color correction applies to OHMDs and transparent displays in general. Welland et al. generated four color correction algorithms for transparent displays: trivial, weighted, simple smooth and advanced smooth [24]. All these methods use a digital camera to capture the background image and map it to the pixel coordinates of the transparent display. The trivial method removes the background RGB values from the foreground image. Weighted also performs background subtraction but with user-defined weights for the background and foreground. Simple smooth introduces luminosity of the background image as a limit to the subtraction. Finally, advanced smooth extends the simple smooth by adding user defined weights for the background and foreground. The main problem of all these methods is that they operate on RGB space, which is a color space created to store and represent color but has little relation to the way colors interact or are perceived by users, as shown empirically [22]. Therefore, subtraction of RGB components often results in black.

As noted above, color blending is a function of two color distortions—render and material—introduced by the transparent display [22]. The render distortion accounts for the particular way a display shows a given color (Dc—display color). The material distortion accounts for how the transparent display alters a background color (Bc) as it passes through the transparent material. Equation 1 defines the blended color as the addition (in the CIE XYZ color space) of the colors resulting from the two distortions.

$$\text{Blend}(Dc, Bc) = f_{render}(Dc) + f_{material}(Bc) \quad (1)$$

Equation 2 presents the general definition of color correction for a display color Dc on background Bc. The correction color Xc, is that which blend with Bc is at the minimum distance to the desired display color Dc.

$$\text{Correct}(Dc, Bc) = Xc | \min(\text{distanceLAB}(\text{Blend}(Xc, Bc), Dc) \quad (2)$$

Further to the algorithm noted above which uses colorimetric measurements of the display binned-profile to address the render distortion, and uses an exhaustive search to evaluate the distance function for all the bins in the profile [22], a real time correction algorithm based on display profiles requires determining an efficient method to evaluate the distance function on the display profile. The following section continues this line of enquiry and uses display profiles to address the render distortion. For the purposes of this paper we leave the material out of our scope and treat background colors "as is". We note, however, that a complete color correction solution should characterize the material distortion in order to provide accurate color blending predictions.

The following sections further relate to the design and evaluation of a real-time color correction algorithm based on display profiles, and to how OHMD applications can use color correction on different types of display content. We do this by means of the SmartColor framework. We developed and tested our algorithm using a simulated OHMD environment where color blending is simulated by means of color addition in the CIE XYZ color space. We used a white point for color conversions at D65. The accuracy of the color blending estimations provided by this environment has been measured [22] to be below 1 just noticeable difference (JND=2.3 points in LAB [13]). This level of precision allow us to generalize our results to actual OHMDs, provided a measured display profile is used and the fmaterial distortion is accounted for.

As a display profile we binned the LAB color space from values taken from sRGB. Previous work binned the CIA LAB color space at 5×5×5 to warranty all colors within the bin to be within 1 JND [7122]. However, this means that two consecutive bins have a perceptual distance of ~2 JNDs. A smaller distance between consecutive bins results in smoother transitions between closely related corrections. A distance of ~1 JND between all neighboring bins can be achieved by binning at 1.32×1.32×1.321. However, the memory needed to store such high resolution profile is significant (approx. 132 MB). We generated a binned profile at 2.3×2.3×2.3 to warranty a difference of ~1 JND between two consecutive bins on the sampling planes (approx. 21 MB). As background light we used videos capture at a 6500K color temperature.

In order to propose a new correction algorithm, we studied how a display profile behaves in LAB coordinates during color blending. FIG. 17A shows the sRGB color space binned at 5×5×5 on the LAB color space (L—vertical axis, A—slanted red, B—slanted blue). Each sphere in the graph represents one bin of the display profile. FIG. 17B shows all bins in the profile change when blended with a greenish background. The bin color changes according to the background, and also its location in LAB color space (see the trace lines). The bin representing "black" shifts to the location of the background color (black+green=green). A purplish background moves all bins toward purple (see FIG. 17C). And a light gray background moves all the bins upwards toward white (see FIG. 17D). This representation is consistent with Gabbard et al.'s two-dimensional plots of color blending [4], and reveals three properties of a blended profile:

All bins are changed by the background and move together.

Background brightness is passed on to the whole profile, so that no blended bin is darker than the background.

Despite the considerable changes in shape and size, the profile bins preserve their spatial relations.

Figure 17:
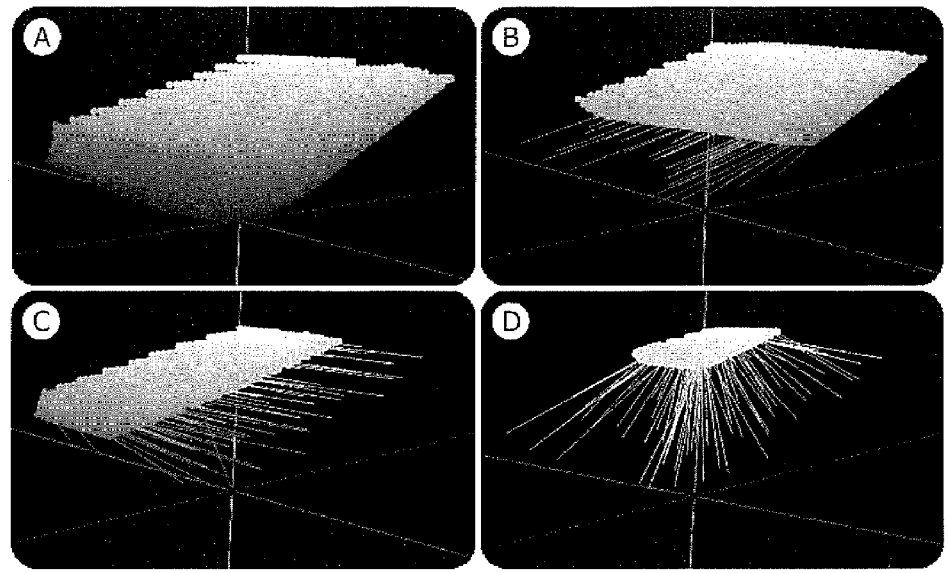
FIG. 17A shows the sRGB color space binned at 5×5×5 on the LAB color space (L—vertical axis, A—slanted red, B—slanted blue). Each sphere in the graph represents one bin of the display profile.
FIG. 17B shows all bins in the profile change when blended with a greenish background. The bin color changes according to the background, and also its location in LAB color space (see the trace lines). The bin representing "black" shifts to the location of the background color (black+green=green).
FIG. 17C shows that a purplish background moves all bins toward purple.
FIG. 17D shows that a light gray background moves all the bins upwards toward white.

The implication of these properties is that for any given point in LAB, the distances from the bins to the point are ordered. And this pattern is followed also after the bins blend with a background color. For the sake of simplicity, we explain the following steps in a one-dimensional space. Given colors C1, C2, and C3 where:

From FIG. 17 we deduce that for any background Bc

Blend(C1,Bc)<Blend(C2,Bc)<Blend(C3,Bc)

Therefore, for any display color Dc, if distance(Blend(C2,Bc),Dc)<distance(Blend(C3,Bc),Dc)

Then distance(Blend(C1,Bc),Dc)<distance(Blend(C3,Bc),Dc)

Our algorithm, called QuickCorrection, leverages the ordered natured of the blended profile to calculate distance to the desired display color on a subset of the display profile bins. Our algorithm is inspired in traditional binary search for ordered vectors. When correcting a display color Dc on a background Bc proceed as:

1. The display profile is represented as a 3D matrix of size Lmax, Amax and Bmax. To start, the algorithm locates itself on the center bin (l0, a0, b0). The current location is called origin.
2. Calculate the distance from the blended origin to Dc.
3. A variable step exists for each axis, Initialized as a quarter of the axis size, e.g. stepL=Lmax/4.
4. While at least one step variable is greater than zero, do:
4.1 For each axis find the bins locate at origin+step and origin−step, to form a set of 6 samples, 2 In each axis. Each axis configures a sampling plane.
4.2 Calculate the distance from the blended samples to Dc, and estimate how much smaller each distance is compared distance calculated for the origin.
4.3 If none of the samples is closer than the origin then divide all steps by 2. Go to step 4.
4.4 If at least one sample is closer than origin then move the origin along a vector created by the relative weights of the closer samples. Go to step 4.
5. Return origin.

In this section we analyze the correction capacity of the BestFit [22] and QuickCorrection algorithms. We implemented the algorithms as fragment shaders for OpenGL. See the next section for details.

As test data we used random RGB pixels (alpha=255) for pairs of foreground and background 384×216 images (82, 944 pixels). We collected data for 4 such image pairs for a total of 384×216×4=331,716 corrections. For each pixel pair we computed the normal blend (no correction) and the solutions with the two algorithms. We measured the distance in LAB from the intended foreground to the normal blend and to the blends of the two solutions. Colors are blended by using color addition in the CIE XYZ color space, and distances are calculated using the CIA LAB color space. In all cases we used a D65 white point. This color blending prediction has a measured accuracy within 1 JND [22].

Figure 18:
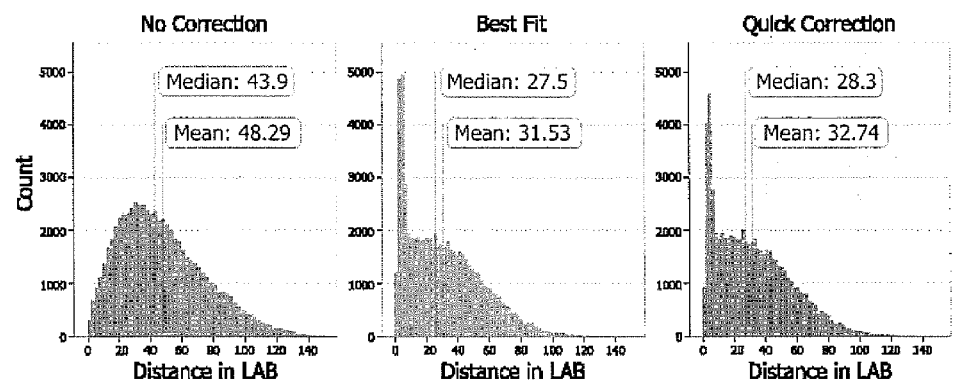
FIG. 18 shows the distribution of the blend distances.

FIG. 18 shows the distribution of the blend distances. Both correction algorithm present a similar correction pattern with the mean distance moving from 48.29 (no correction) to 31.53 in BestFit and 32.74 in QuickCorrection. These reductions means a general improvement of 34.7% and 32.2% respectively. In other words, BestFit colors are in general 34.7% closer to the desired color. Similarly, QuickCorrection colors are 32.2% closer to the desired color. Statistical analysis with the Wilcoxon test for non-parametric data revealed both methods are significantly different than no correction (BestFit Z=−222.014 p=0.0, QuickCorrection Z=−221.593 p=0.0) and from each other (Z=−120.425 p=0.0).

Figure 19:
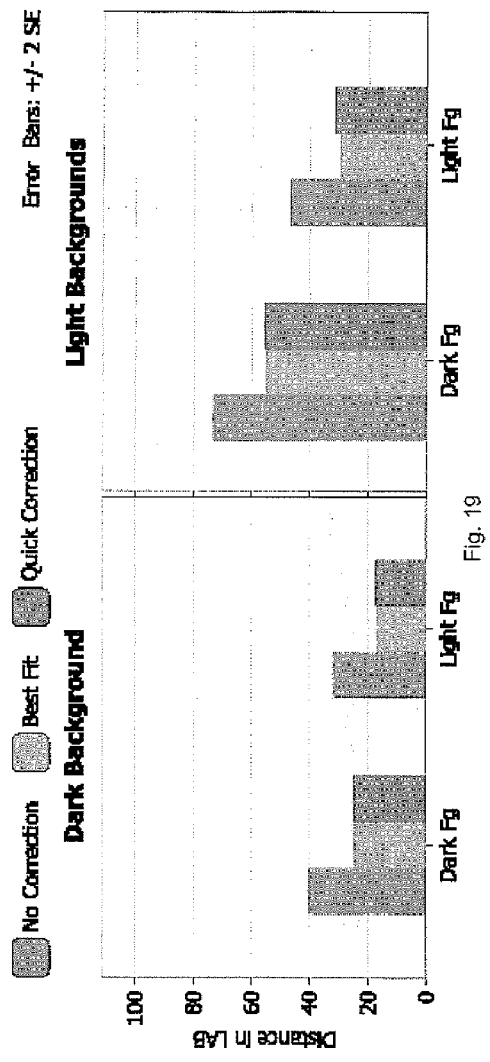
FIG. 19 shows the original blend (gray) and the blends corrected with the BestFit (green) and QuickCorrection (blue) algorithms.

FIG. 19 shows the original blend (gray) and the blends corrected with the BestFit (green) and QuickCorrection (blue) algorithms. The chart bars are divided according to dark (L<=50) and light (L>50) foreground and backgrounds. The foreground colors most affected by color blending are those with low luminosity (dark), particularly in light backgrounds (such as daylight conditions). This is due to the additive nature of color blending by which the L value of the background will "move up" the entire display profile. FIG. 19 also shows the correction accuracy of QuickCorrection to behave similarly to BestFit across the different luminosity levels. An important corollary of our analysis is that, taking into account that the BestFit algorithm tries all possible display colors, software-only color correction cannot achieve correction rates higher than 34.7%. In other words, the effects of the background color—particularly L—cannot be completely removed with software-based color correction alone.

Figure 20:
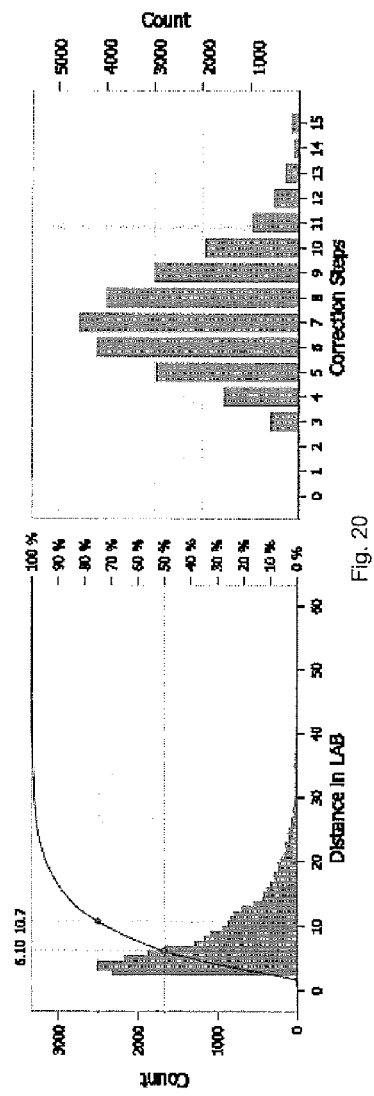
FIG. 20 left side shows the distribution of the remaining samples which did not result on the same color and FIG. 20 right side shows the histogram of the required steps.

A closer comparison between BestFit and QuickCorrection showed that in 2.91% of the pairs for which a perfect solution was possible (distance between the desired foreground and the BestFit solution blended with the background equals to zero) QuickCorrection achieved it in 2.33% of the cases. Moreover, QuickCorrectlon arrived to the exact same solution as BestFit in 53.25% of the cases, and in 61.40% the two solutions where perceptually equivalent (distance in LAB<=2.3). FIG. 20 left shows the distribution of the remaining samples which did not result on the same color. The graph shows that 50% of the differences (80.7% of the total) are within 6.1 LAB units or less than 3 just-noticeable differences (JND). Also, 75% of the differences (90.35% of the total) are within 10.7 LAB units or less than 5 JNDs. Interestingly, in 0.56% of the corrections QuickCorrection arrived to a solution worse than the original blend.

Finally, we measured the number of steps QuickCorrection required to arrive to a solution (steps 4.3 and 4.4 of the algorithm). FIG. 20—right shows the histogram of the required steps. Visual inspection of shows the mean number of steps to be between 7 and 8, and that most solutions are found within 15 jumps.

Graphics Pipeline Implementation

Implementing color correction with the modern graphic pipelines (such as DirectX or OpenGL) can be done at different stages of the rendering process. The rendering process receives drawing coordinates (vertices) and primitives (line, triangle, square, etc) and converts them into pixels on the display. User code can intervene in the process and modify the attributes of vertices or fragments such as their location and color. A detailed explanation of the graphics pipeline is beyond the scope of this paper and we refer the reader to [16][17]. However, we would like to highlight the different computational demands of the vertex and fragment programs. This is important because ideally we would like a color correction algorithm to be integrated to the graphics processing while using the least possible computational resources.

Figure 21:
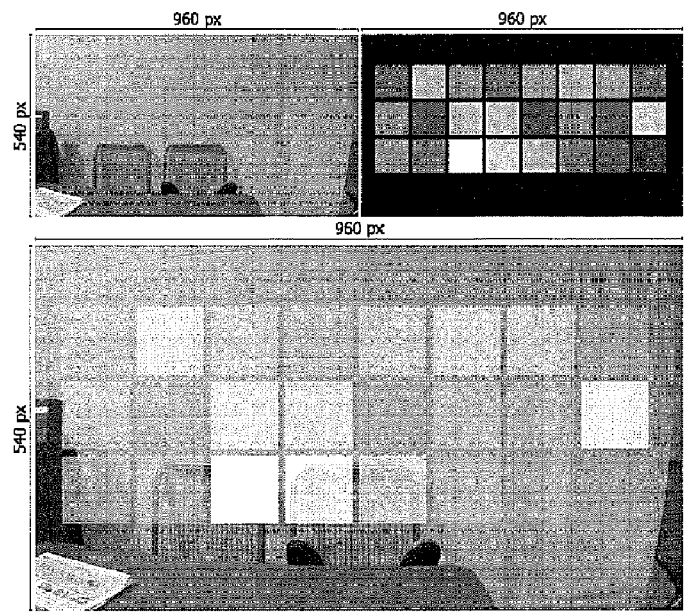
FIG. 21 presents the background (top-left) and foreground (top-right) used in the subsequent examples.

The basic building block for computer graphics are primitives. A primitive is an order to the graphics card to draw basic shapes from a set of vertices. For example, to draw a triangle the system requires three vertices grouped into a TRIANGLE primitive. Complex shapes are an accumulation of simpler primitives: e.g., a rectangle is four vertices grouped in two triangles. The rasterization stage converts vertices and primitives into fragments, which can be understood as pixel candidates. The location and color of each fragment is calculated by interpolating the values on the vertices. Following this process, modern graphic systems generate large amounts of pixels from small amounts of data (vertices, primitives). The rest of this section explores the implementation of the QuickCorrection algorithm as a fragment and a vertex program. FIG. 21 presents the background (top-left) and foreground (top-right) used in the subsequent examples. Please note that FIG. 21—top-right is made by the 24 ColorChecker colors and each square is built with two OpenGL triangle primitives. FIG. 21—bottom shows the blend without correction.

Fragment Shader Implementation

In order to implement color correction on OHMDs we need to capture the background colors which blend with the display. With a camera on the OHMD we can image capture the background and estimate the background color for each individual pixel on the display. With this background image as input we first explore QuickCorrection as a fragment program.

We implemented the QuickCorrection algorithm using OpenGL Shading Language (GLSL) 1.40 for compatibility with computers with low-end graphics cards. The algorithms used a 2.3×2.3×2.3 display binned profile created from sRGB, and passed it to the shader as a rectangular texture. The aligned background image was also passed down to the shader as a texture. Based on the analysis of steps discussed before, we limited the number of jumps to 15.

Figure 22:
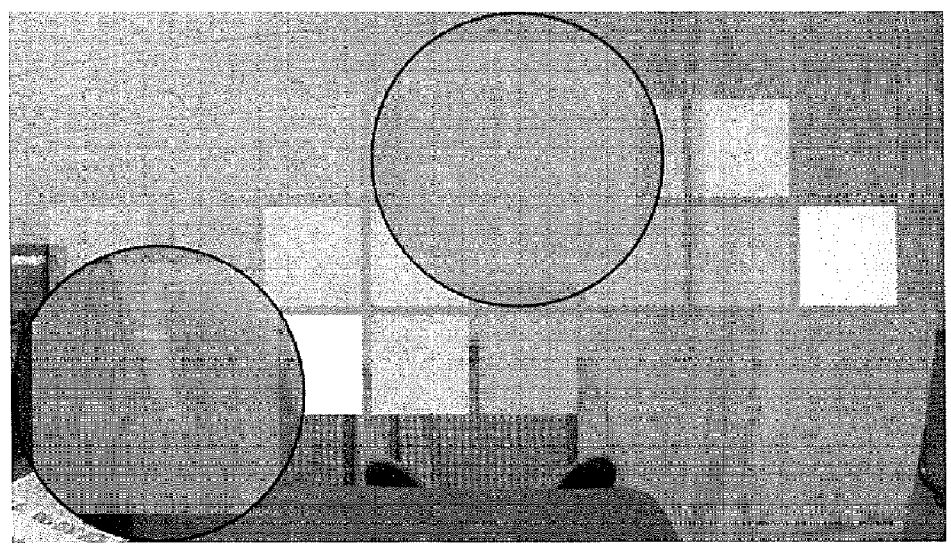
FIG. 22 shows our pair of sample images corrected with the QuickCorrection fragment shader.

FIG. 22 shows our pair of sample images corrected with the QuickCorrection fragment shader. The first impression is that the colors look, in general, more saturated than the blended image and closer to the desired foregrounds. In the case of the gray squares in the middle correction can be achieved almost perfectly to the point of occluding the chair behind. Another result of the QuickCorrection algorithm is that rectangles in colors similar to the background (top-left and lower-right) almost disappear. This is due to the correction result being a low luminosity color. The circular close-ups show how pixel-level correction might often results on significantly different colors for consecutive display pixels, with the resulting display pixels forming a "rough" image.

We further analysed QuickCorrection's runtime performance. We measured the runtime performance for a rectangle of semi-random pixels covering different percentages of the display area (10%-100%—at 100% the image size is 960×540 pixels which is a common image size for commercially available OHMDs). The background pixels were also randomly generated. Both background and foreground pixels were generated only once in order to remove the generation cost from our runtime analysis. At 30% of the display area, the foreground image is 288×162=46,656 pixels. This mean that for each frame the QuickCorrection fragment shader is executed 46,656 times, with its associated accesses to memory to navigate the display profile. Similarly, at 70% the foreground image is 672×378=254,016 pixels or corrections per frame. We ran the QuickCorrection shader on a mobile Intel HD-3000 GPU @ 350 MHz (2 cores, 4 threads, OpenGL 3.1) and on a high end NVidia K4000 @ 810 MHz (768 cores, OpenGL 4.3). For each percentage and target platform we ran the shader for 10 seconds and calculated the average frames-per-second (FPS).

Figure 23:
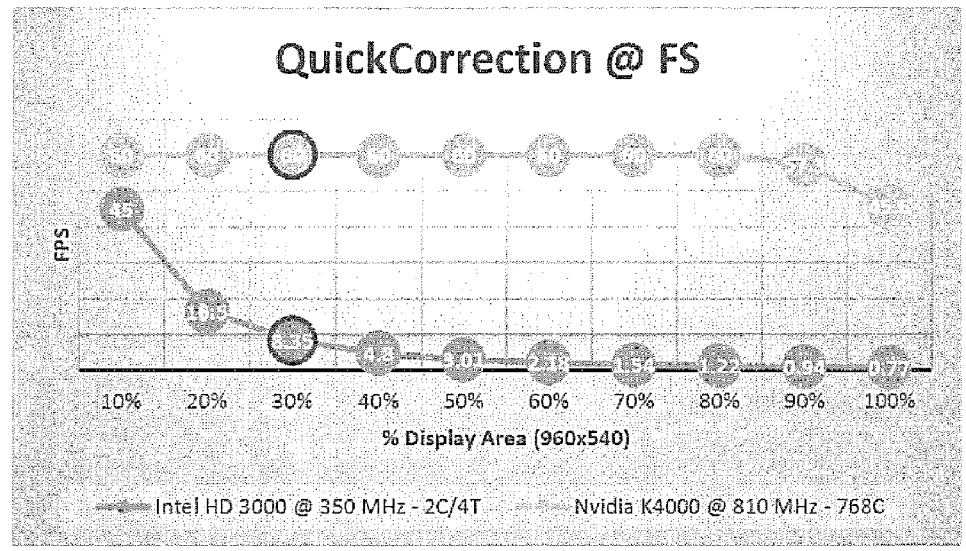
FIG. 23 shows the runtime performance results.

FIG. 23 shows the runtime performance results. As expected the high-end platform was not significantly affected by the correction algorithm. Only at 90% of the display area (420K corrections per frame) a slow decline was registered, a trend that continued when correcting 100% of the display area down to 45.6 FPS. On the other hand, the performance of the low-end (mobile) platform decreased exponentially as a function of the display area corrected. The platform can only preserve real-time correction rates at 17% of the display area. The exponential decrease restrict the applicability of QuickCorrection as a fragment shader only to computationally capable GPUs. Please note that no other CPU or GPU processing executed while collecting data, meaning that the FPS would be lower than measured when using the application-specific graphics and CPU code.

Vertex Shader Implementation

Our second implementation moves the QuickCorrection algorithm to the vertex shader. Operating on the smaller number of vertices rather than fragments reduces the computational demand on the GPU. Moreover, by leveraging the interpolation capabilities of the graphics pipeline, we expect the consecutive fragments to vary less, resulting in smoother surfaces within an object. Two further considerations motivate the transition to the vertex shader. The first motivation is the observation that real-world objects often have uniformly colored surfaces. This consistency in color allows our vision system to make out contours which we use to recognize such objects. The second motivation relates to the parallax inconsistency between the user's eye and the camera capturing the background. The parallax problem means background captures need to be transformed to the perspective of the eye before mapping the display and background pixels. However, transformations techniques cannot account for the differences in depth between the objects in the scene. This limitation makes it impossible to achieve perfect matching between foreground and background pixels. Nonetheless, if the distance between the eye and the camera is short enough, and given our first motivation (uniform surfaces) the background color for a particular vertex can be estimated as an average from a number of pixels. The particular shape of the zone to average depends on the physical configuration of hardware elements and is beyond the scope of the current paper. For our purposes of validating the correction algorithm, we assumed an arbitrary average rectangle of 20 pixel sides. We arrived to the 20px mark iteratively.

Figure 25:
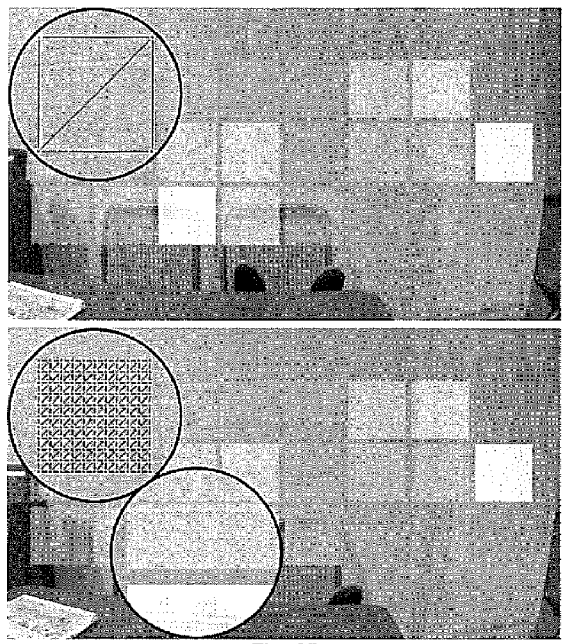
FIG. 25 shows color correction at two tessellation levels.

Given the relatively large size of the interface components such as the squares of our color checker sample (see FIG. 21—top-right), background changes between vertices are unaccounted for. While this is desirable when the changes are relatively small (as explained before), when changes are large colors should ideally be corrected again. To address this concern we tessellate the larger triangle primitives into smaller ones, and color correct the resulting vertices. This approach increases the number of vertices, but operates in still smaller numbers of vertices than fragments. FIG. 25 shows color correction at two tessellation levels. For uniform surfaces like the yellow wall, both results are equivalent to correction on the fragment shader. In uneven backgrounds, the finely tessellated rectangles adapt their corrected colors to the objects in the scene (see lower part of FIG. 25—bottom).

Figure 24:
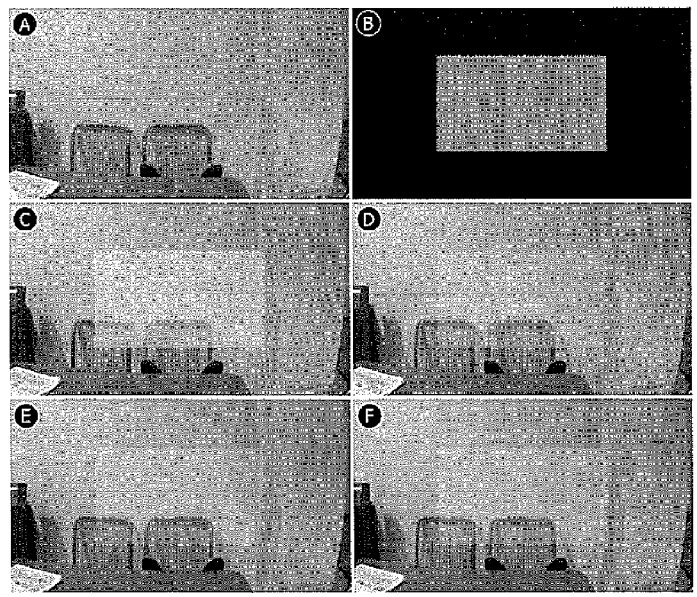
FIG. 24 shows all the correction alternatives, where E) shows an unevenly corrected rectangle and shows the results after a simple majority vote.

Correcting at the vertex shader also presents problems such as uneven correction and flickering. The green highlight in FIG. 25—bottom shows that for the mostly uniform yellow wall, the internal vertices of the rectangle change their colors considerably giving the impression of unevenly corrected figures. In order to maximize consistence throughout the corrected figure and minimize the unevenness of the rectangle we implemented a simple voting option which, after correcting at the vertex level, determines the bin which appeared most commonly as the correction result and propagates it to all the vertices. We implemented voting using the transform feedback mechanism of OpenGL. FIG. 24 shows all the correction alternatives, where E) shows an unevenly corrected rectangle and shows the results after a simple majority vote. The second problem is the observable flicker between frames due to subsequent frames finding different correction results when the background change is small. A smoothing mechanism can be implemented to reduce the inter-frame flicker where the color to be applied in the current frame is a function of a few recent corrections (e.g. average of the last 20 corrections).

Figure 26:
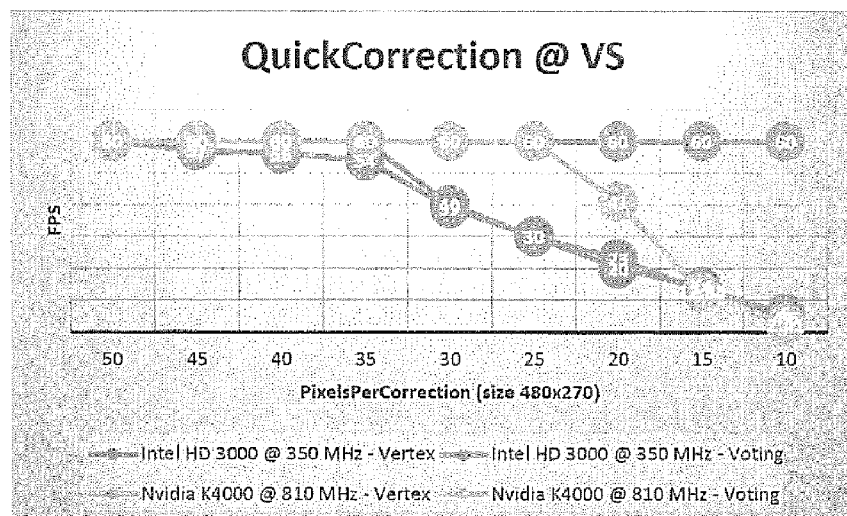
FIG. 26 shows performance of QuickCorrection as a vertex shader, with and without voting.

To study the performance of QuickCorrection as a vertex shader we used random noise as background and a 480×270 pixels rectangle. This size is equivalent to 50% of the size in the previous experiment. The rectangle was tessellated from 50 to 10 pixels-per-correction (PPC) in increases of 5. Each vertex of the resulting mesh was assigned a random color. FIG. 26 shows performance of QuickCorrection as a vertex shader, with and without voting.

Without voting, the high end computer did not have any noticeable performance impact (60 FPS), while the mobile computer consistently decreased performance. Compared to the fragment shader results (3.1 FPS at 50%), the mobile computer has a noticeably higher performance up to 15 PPC where it runs at 12 FPS. Interestingly, at 10 PPC the performance is similar to the fragment shader. One reason for such low performance is the added overhead of calculating an average background of 20px2 per vertex. More interesting is how quickly the voting alternative degrades in the high-end machine. At this point, more research is necessary to determine the cause of this performance decrease.

In this section we present SmartColor, a graphics middleware which leverages QuickCorrection to facilitate the creation of user-interface components for OHMDs. We present the first SmartColor implementation, which focuses on two low-level ui components: i) 2D shapes: rectangle, ellipse, triangle, and line (these components are used as icons, and drawing elements); and ii) Text labels which provide colored textual content.

Although a limited set, these components are the foundation of all two-dimensional user-interfaces such as WIMP. They can be used to build wearable interfaces similar to Google Glass, and 2D augmented-reality applications such as the showcased ORA S display.

SmartColor relies on our QuickCorrection implementation as a vertex shader. Therefore all user interface components are defined as a set of vertices. The 2D shapes are defined via OpenGL meshes where a series of TRIANGLE primitives configure the desired shape. Ellipse components have a circle resolution of 360 circumference points. Text labels are implemented as a textured font. Texture fonts map the coordinates of a letter in a texture image to the coordinates for the letter on the display (scaled and translated). This means there are only four vertices per character. Given that the number of vertices directly influences the quality of the correction, text labels rely on a background mesh over which corrections are made. This mesh is equivalent to the one on the 2d rectangle component, and is not made visible in the user interface.

Interface developers also define the pixels-per-correction (PPC) and correction steps parameters. The mesh behind each component is tessellated based on the provided PPC—default 20px. We limit the PPC to minimum 15px, in order to warranty high performance even in small computers as shown in FIG. 26. The correction steps parameter defines the max number of refinements per correction. Based on the performance analysis shown in FIG. 20, we limit the number of steps to a maximum of 15.

Based on the QuickCorrection algorithm, SmartColor supports the following color manipulation strategies: correction, contrast and show-up-on-contrast. Correction simply applies the correction algorithm to the component's mesh in the way presented in the previous section. FIG. 25 and FIG. 24 EF present correction examples for a 2D rectangle component.

Figure 27:
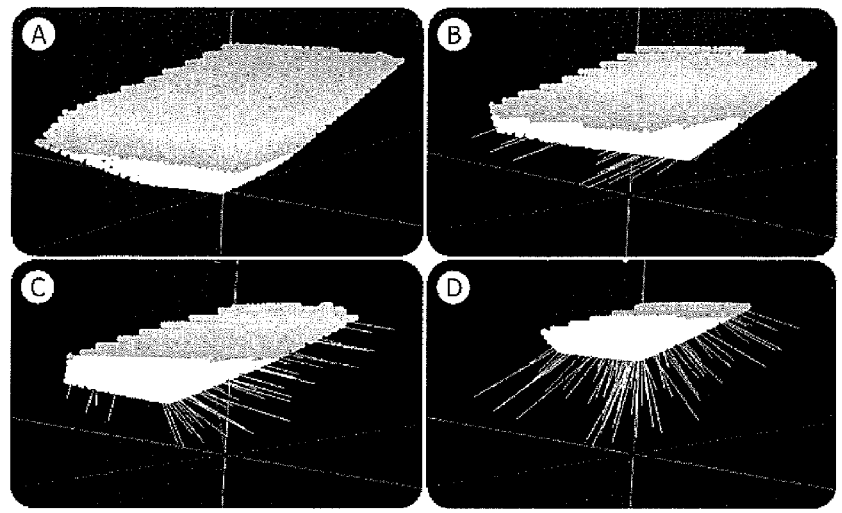
FIG. 27 shows how this volume changes size according to the background. The bins painted white do not provide the required difference in luminance.

The contrast strategy aims at providing textual content with the required luminance difference of 27 units against the background [25]. This is implemented by limiting the QuickCorrection search to the bins of the display which, upon blending, have a minimum different of 27 units of luminance with the background. FIG. 27 shows how this volume changes size according to the background. The bins painted white do not provide the required difference in luminance. In FIG. 27A the profile is blended with a black background. In this case the bins that produce the required contrast are a large subset of the profile. However, increases in the background's luminosity decreases the number of suitable bins. For contrast operations QuickCorretion uses the top-most bin (white) as its initial position in order to warranty white as the solution to the backgrounds with the highest luminosity. We limit the QuickCorrection search algorithm to the valid bins by checking that the bin sampled in the vertical axis has the required contrast requirement. Using QuickCorrection to correct for contrast not only results on a color that maximizes readability for a given background (something which could be achieved by modifying the L component of the display color [8]), but also on a hue which is as close as possible to the originally desired hue.

Figure 28:
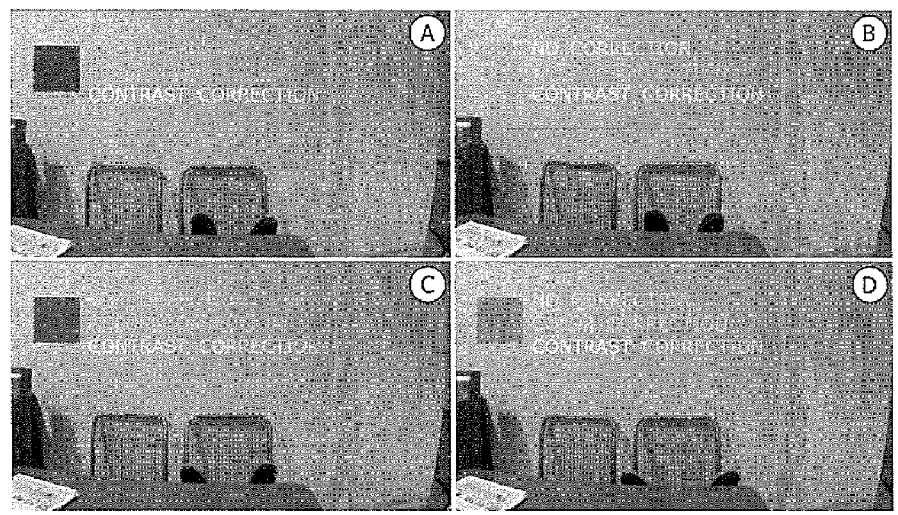
FIG. 28 shows examples of correction and contrast for text labels at different foreground colors.

FIG. 28 shows examples of correction and contrast for text labels at different foreground colors. The rectangle on the right shows the color as we want it to look through the transparent display (added for reference purposes). The top label is neither corrected nor contrast adjusted and it shows how the text would normally look. The second label is color corrected, and it shows how correction actually brings the color closer to the desired color on the neighboring square. Please note that for cases A and B the color corrected label is almost undistinguishable from the background. The bottom label shows the contrast corrected textual content which is both visible and maintains some of the desired hue in all cases.

Figure 29:
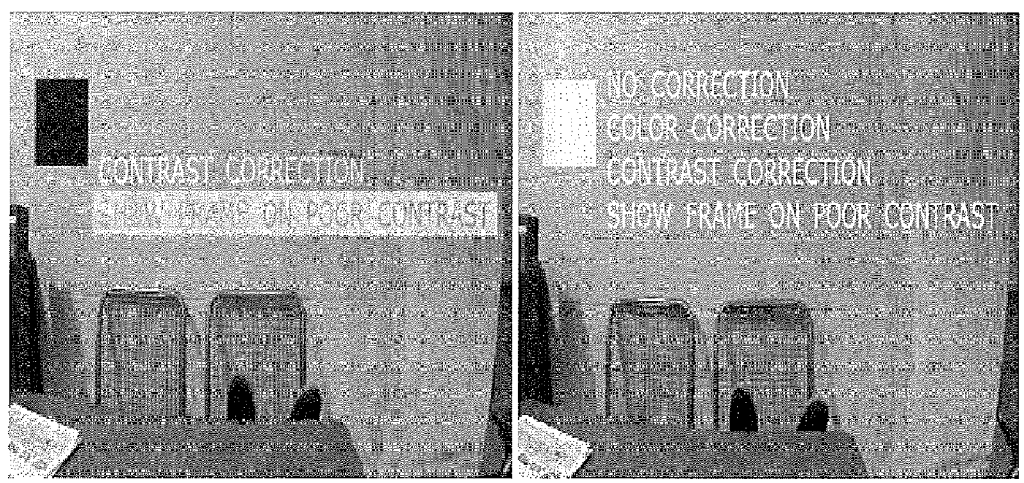
FIG. 29 left shows the no correction, correction, and contrast strategies, together with the shown-upon-contrast strategy and FIG. 29 right shows that when the required contrast difference exists the bounding box is not shown.

The final color manipulation strategy is show-up-on-contrast, or better understood as "shown when a related component presents a poor contrast ratio with the background". FIG. 29 left shows the no correction, correction, and contrast strategies, together with the shown-upon-contrast strategy. The light blue bounding box of the last label is shown because the dark blue color of the text does not have the necessary contrast difference from the background. FIG. 29 right shows that when the required contrast difference exists the bounding box is not shown. This strategy is an alternative to the contrast strategy and aims at maintaining the text color for situations where color encoding of the text is important (e.g. alert or status messages).

Note that for all manipulation strategies, interface developers can determine whether to use a simple correction at the vertex level, or to execute a further voting (see FIG. 24F) and smoothing steps.

We implemented SmartColor on top of OpenFrameworks (OF) 0.8 for C++. Our target platform was OpenGL 3.1 with GLSL 140. The display profile is passed as a 2D texture. By relying on OF, SmartColor is multi-platform for desktop and laptop computers. Support for OpenGL ES and GLSL ES is left for future work.

QuickCorrection navigates display profiles using sampling, a radically new approach. This approach is not obvious from a traditional computer graphics perspective (i.e. colours in RGB), and it's valid only once we consider a perceptual representation of colour (i.e. using the CIE LAB colour space). Our key contribution is to demonstrate the real-time feasibility of color correction for oHMDs. We explored fragment and vertex shader implementations in terms of performance, raising important implications for user interface design: fragment-level correction is both costly and impractical (parallax problems); correction should happen at the vertex level, implying the use of shader-based texturing.

Based on QuickCorrection we proposed SmartColor, a framework for simple user-interface components. SmartColor allows the correction of color and contrast of ui components according to the background, and to display content conditional to the contrast level of another. While this contributions stand far from complete occlusion support, they offer new options for the increased legibility and preservation of color encodings in OHMD.

SmartColor's two major missing components are the support for images and 3D content. For images we cannot apply operations at the vertex level and therefore need to apply re-coloring strategies. 3D objects such as planes, spheres, cylinders, cones and arbitrary 3D meshes, are needed for creating immersive augmented reality applications. Our current efforts focus on supporting this type of content, although we note that any such implementation is limited in its capacity to reproduce proper lighting (dark zones in an object) due to the transparency factor. A direction that follows from our current work, particularly the approach we used for text labels, is to use a background mesh to determine the base color for a 3D object (material color).

Since various modifications can be made in my invention as herein above described, it is intended that all matter contained in the accompanying specification shall be interpreted as illustrative only and not in a limiting sense.

The invention claimed is:

1. A method of displaying a desired color value on a prescribed pixel of an optical see-through display through which a background is visible, in which the optical see-through display is operatively connected to a controlling computer and the optical see-through display defines a display profile of prescribed color values that the optical see-through display is capable of rendering, the method comprising:

executing programming instructions on the controlling computer to:
(i) capture background image data relating to said background and identify within the background image data a background color value associated with the prescribed pixel;
(ii) add said background color value associated with the prescribed pixel to the prescribed color values of the display profile so as to calculate a perceived color profile of predicted color values which are representative of colors perceived by an observer when the prescribed color values are observed on the optical see-through display over a background having the background color value;
(iii) comparing the desired color value to the predicted color values of the perceived color profile to determine a selected color value among the predicted color values which most closely numerically matches the desired color value; and
(iv) display the selected color value on the prescribed pixel of the optical see-through display whereby the observer viewing the background through the prescribed pixel of the optical see-through display substantially perceives the desired color value.

2. The method according to claim 1 further comprising executing the programming instructions on the controlling computer to correct the background color value such that the background color value represents the background as seen through a material forming a see-through display portion of the display prior to adding said background color value to the prescribed color values of the display profile when determining the perceived color profile.

3. The method according to claim 1 wherein each color value is defined using an XYZ color space.

4. The method according to claim 1 further comprising:
determining said selected color value by executing the programming instructions on the controlling computer to:
i) identify a subset of predicted color values which are most closely related to the desired color value; and
ii) compare the desired color value only to said subset of the predicted color values of the perceived color profile.

5. The method according to claim 4 including limiting the subset of predicted color values to the predicted color values which have a luminance which is at least a prescribed number of units greater than a luminance of the respective background color value of the prescribed pixel such that the prescribed number of units defines a minimum contrast limit.

6. The method according to claim 4 further comprising:
executing the programming instructions on the controlling computer to determine said selected color value of the predicted color values by:
(i) representing the predicted color values as a matrix of color points along three defined axes;
(ii) initially defining a selected color point at a central location along each of the three defined axes;
(iii) identifying two sample color points in opposing directions along each of the three defined axes relative to the selected color point;
(iv) determining which matching ones of the sample color points are a closer match to the desired color value than the selected color point;
(v) determining an average vector which represents an average of said matching ones of the sample color points relative to the selected color point;
(vi) redefining the selected color point by applying the average vector to the previously selected color point whereby the selected color point remains as the previously selected color point if none of the sample color points are determined to be a matching one; and
(vii) repeating steps (iii) through (vi) until the selected color point substantially matches the desired color; and
(viii) defining said selected color value as the selected color point.

7. The method according to claim 6 including executing the programming instructions on the controlling computer to repeat steps (iii) through (vi) a prescribed number of repetitions which defines an iteration limit.

8. The method according to claim 6 including, if the selected color point remains as the previously selected color point, executing the programming instructions on the controlling computer to repeat steps (iii) through (vi) by identifying two new sample color points in opposing directions at a reduced distance along each of the three defined axes relative to the previously identified sample color points.

9. The method according to claim 6 including executing the programming instructions on the controlling computer to cease to repeat steps (iii) and (vi) when a difference between the selected color point and the desired color value are below a minimum threshold.

10. The method according to claim 6 including executing the programming instructions on the controlling computer to remove sample color points having a contrast relative to the respective background color value which is below a minimum contrast limit from said group of color points prior to determining which color point most closely matches the desired color value.

11. A method of displaying pixels of a graphic object, the method comprising:
displaying a desired color value of the pixels of the object according to the method of claim 1; and
if said selected color value has a luminance which is less than a prescribed number of units from a luminance of the respective background color value of the respective pixels, executing the programming instructions on the controlling computer to define a surrounding object comprised of plural pixels which fully surrounds the graphic object and which has a prescribed contrasting color value.

12. The method according to claim 11 wherein the prescribed contrasting color value is displayed according to the method of claim 1 for displaying a desired color value.

13. A method of displaying pixels of a graphic object defined as a set of first primitives in which each first primitive is defined by a set of vertices, the method comprising:
executing programming instructions on a computer to:
(i) redefine the graphic object as a set of second primitives in which each second primitive is defined by a set vertices and in which the set of second primitives are reduced in size and increased in number relative to the set of first primitives; and
(ii) to associate a desired color value with each of the vertices of the second primitives according to the method of displaying a desired color value of a pixel according to claim 1 before converting the vertices into fragments or pixels.

14. The method according to claim 13 including executing the programming instructions on the computer to apply a voting algorithm to determine a common one of the desired color values which is associated with the greatest number of vertices of the second primitives, and assigning the common one of the desired color values to all of the vertices of the second primitives before converting the vertices into fragments or pixels.

* * * * *